United States Patent
Zavracky et al.

(10) Patent No.: US 7,365,811 B2
(45) Date of Patent: Apr. 29, 2008

(54) DISPLAY HOUSING WITH A DISPLAY ALIGNMENT DEVICE

(75) Inventors: Matthew Zavracky, Plympton, MA (US); Rodney J. Bumgardner, Los Gatos, CA (US); Lawrence Cuprys, Felton, CA (US)

(73) Assignee: Kopin Corporation, Taunton, MA (US)

( * ) Notice: Subject to any disclaimer, the term of this patent is extended or adjusted under 35 U.S.C. 154(b) by 3 days.

(21) Appl. No.: 11/186,332

(22) Filed: Jul. 21, 2005

(65) Prior Publication Data

US 2005/0270437 A1   Dec. 8, 2005

Related U.S. Application Data

(63) Continuation of application No. 10/022,190, filed on Dec. 17, 2001, now Pat. No. 6,967,697, which is a continuation-in-part of application No. 09/843,534, filed on Apr. 25, 2001, now Pat. No. 7,253,852.

(60) Provisional application No. 60/256,200, filed on Dec. 15, 2000.

(51) Int. Cl.
*G02F 1/1333* (2006.01)
(52) U.S. Cl. ................................................ 349/58
(58) Field of Classification Search ................ 349/58
See application file for complete search history.

(56) References Cited

U.S. PATENT DOCUMENTS

| 3,922,051 A | 11/1975 | Reynolds |
|---|---|---|
| 4,111,533 A | 9/1978 | Nakamura et al. |
| 4,297,022 A | 10/1981 | Lester |
| 4,514,920 A * | 5/1985 | Shafrir et al. ................. 40/448 |
| 4,963,001 A | 10/1990 | Miyajima |
| 4,977,456 A | 12/1990 | Furuya |
| 5,211,463 A | 5/1993 | Kalmanash |
| 5,300,976 A | 4/1994 | Lim et al. |
| 5,406,399 A * | 4/1995 | Koike ........................ 349/58 |
| 5,422,751 A | 6/1995 | Lewis et al. |

(Continued)

FOREIGN PATENT DOCUMENTS

DE    34 08 176 A1    9/1985

(Continued)

OTHER PUBLICATIONS

CyberDisplay™, "*CyberDisplay™ 320 Monochrome Display Model 290 KCD-QD01-Ba*", Kopin Corporation, Feb. 22, 2001.

*Primary Examiner*—David Nelms
*Assistant Examiner*—Richard H Kim
(74) *Attorney, Agent, or Firm*—Hamilton, Brook, Smith & Reynolds, P.C.

(57) ABSTRACT

Alignment of an imaging area of a display with a user's eye provides optimum image quality for the user. Typically, a display is formed of a display panel encased within a carrier. The carrier is used to mechanically align the display panel within a device housing. However, the display panel must first be aligned within the carrier and the carrier and display combination aligned within a device housing. By utilizing the display panel without the carrier, one alignment step is removed from the installation process. Placing the display panel within a housing having an alignment device ensures proper alignment of an imaging area of the display panel with an opening of the housing.

48 Claims, 25 Drawing Sheets

U.S. PATENT DOCUMENTS

| | | |
|---|---|---|
| 5,440,197 A | 8/1995 | Gleckman |
| 5,508,830 A | 4/1996 | Imoto et al. |
| 5,508,834 A * | 4/1996 | Yamada et al. ............... 349/58 |
| 5,619,373 A | 4/1997 | Meyerhofer et al. |
| 5,684,354 A | 11/1997 | Gleckman |
| 5,709,463 A | 1/1998 | Igram |
| 5,889,567 A | 3/1999 | Swanson et al. |
| 5,892,325 A | 4/1999 | Gleckman |
| 5,926,243 A | 7/1999 | Kim |
| 5,999,237 A | 12/1999 | Miyawaki et al. |
| 6,043,591 A | 3/2000 | Gleckman |
| 6,094,245 A | 7/2000 | Ochi et al. |
| 6,154,261 A | 11/2000 | Shim |
| 6,330,150 B1 * | 12/2001 | Kim ........................... 361/683 |
| 6,335,864 B1 | 1/2002 | Klübenspies |
| 6,559,907 B1 * | 5/2003 | Byoun ........................ 349/58 |
| 6,580,097 B1 | 6/2003 | Soules et al. |
| 6,596,195 B2 | 7/2003 | Srivastava et al. |
| 2001/0043293 A1 * | 11/2001 | Inoue .......................... 349/58 |
| 2002/0167624 A1 * | 11/2002 | Paolini et al. ................ 349/61 |

FOREIGN PATENT DOCUMENTS

| | | |
|---|---|---|
| JP | 03189618 | 8/1991 |
| JP | 05165015 | 6/1993 |
| JP | 06258637 | 9/1994 |
| JP | 07-177398 | 7/1995 |
| JP | 07225375 | 8/1995 |
| JP | 2000075289 | 3/2000 |
| WO | WO 98/19435 | 5/1998 |
| WO | WO 99/23636 | 5/1999 |

* cited by examiner

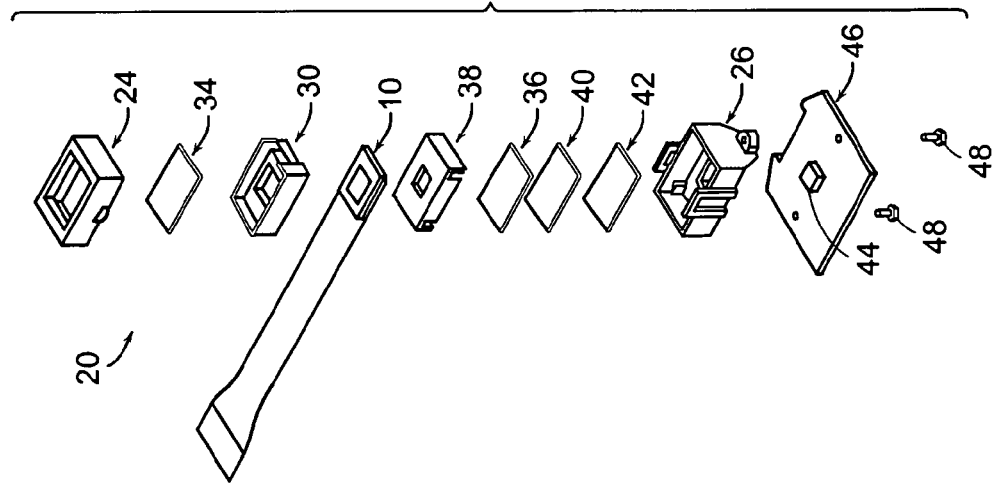
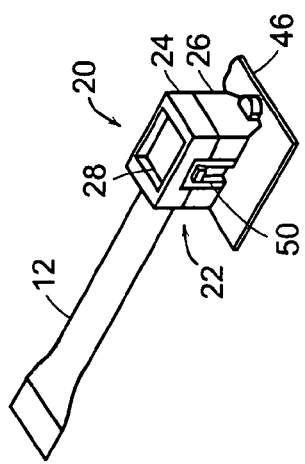
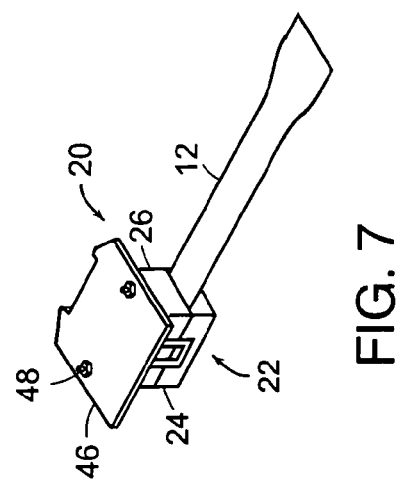

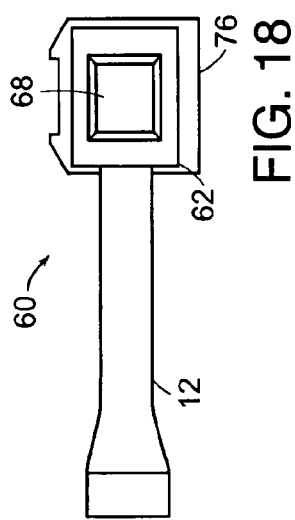
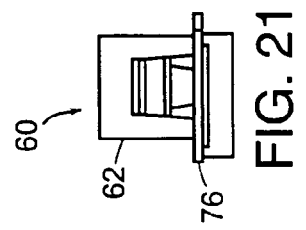
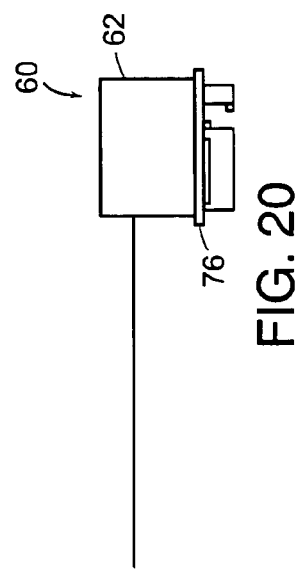
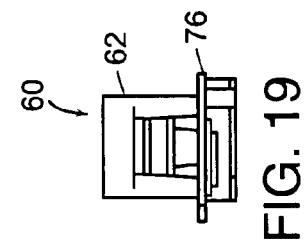
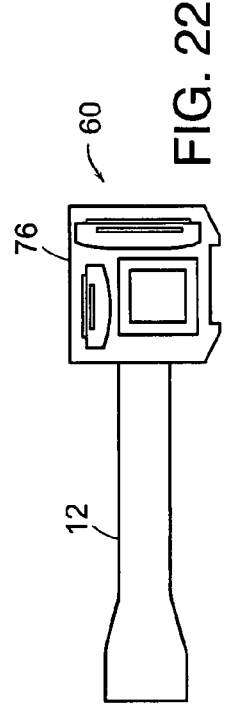

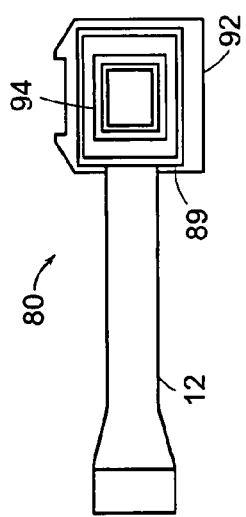
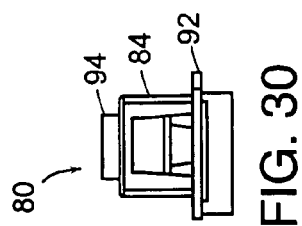
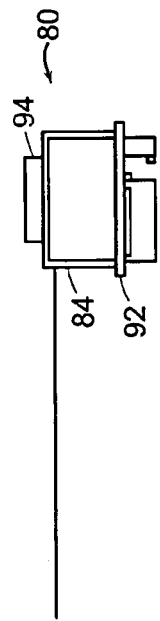
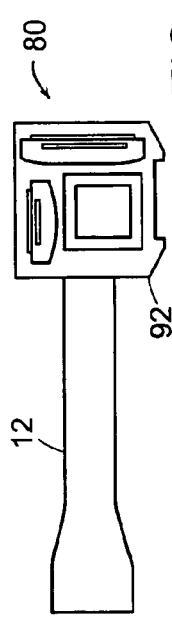
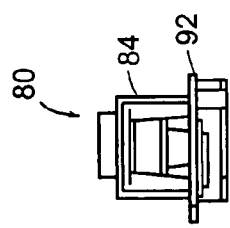

DISPLAY HOUSING WITH A DISPLAY ALIGNMENT DEVICE

RELATED APPLICATIONS

This application is a continuation of U.S. application Ser. No. 10/022,190 filed Dec. 17, 2001 now U.S. Pat. No. 6,967,697, which is a continuation-in-part of U.S. application Ser. No. 09/843,534 filed on Apr. 25, 2001 now U.S. Pat. No. 7,253,852, which claims the benefit of U.S. Provisional Application No. 60/256,200, filed on Dec. 15, 2000. The entire teachings of the above applications are incorporated herein by reference.

BACKGROUND

The development of display technology has allowed the manufacture of relatively small size displays to produce high quality images. Alignment of an imaging area of the display with a user's eye is critical to ensure optimum image quality for the user. For example, if the imaging area of a display is rotated by an angle of greater than three degrees relative to a horizontal reference line, the rotation is noticeable to the eye of a user and can detract from the enjoyment of the use of the display.

Typically, a display is formed of a display panel encased within a carrier. The carrier is used to mechanically align the display panel within a device housing. However, use of the carrier requires two alignment steps be performed in order to align the display with a user's eye. The first alignment step requires that the imaging area of the display panel is aligned within the carrier. The alignment between the display panel and the carrier prevents rotation of the display relative to user's eye. The second alignment step requires that the imaging area of the display and carrier combination must be aligned within the housing of the device in which the display is being used. These two alignment steps introduce stacking errors and tolerance errors that add to the expense of the display.

SUMMARY

Using the display panel without use of the carrier removes one of the alignment steps required in using the display. By utilizing the display panel without the carrier, the housing in which the display panel is placed includes an alignment device to ensure proper alignment of an imaging area of the display panel with an opening of the housing.

A mounting apparatus for a display panel having a single alignment edge includes a housing having a display opening and a display alignment device. The display alignment device is coupled to the housing, and aligns an imaging area of the display panel with the display opening of the housing, based on the single alignment edge.

The display alignment device aligns the imaging area at a rotation of 0°+/−1°, or less, with respect to the display opening.

The mounting apparatus can include a first polarizer mounted to a first surface of the housing and adjacent to the display opening where the first polarizer is outside of a user's field of view during use. The mounting apparatus can also include a second polarizer mounted to a second surface of the housing and adjacent to the display opening. The second polarizer can be positioned opposite to the first polarizer relative to the display panel.

The mounting apparatus can also include a light source attached to the housing for illuminating the imaging area of a display panel. The light source can be a light emitting diode (LED). The LED can be a blue LED that emits a blue light through a phosphor coating to generate a white light. The light source can also be a light pipe. The light source can also include a first diffuser and a second diffuser.

The mounting apparatus also includes a lens mounted to the housing, the lens positioned adjacent to the display opening. The lens can include a torro lens.

The mounting apparatus can include a lateral securing portion where the lateral securing portion laterally compressing the alignment edge of the display panel against the display alignment device to align the imaging area with the display opening. The lateral securing portion can include a spring and ramp combination. The mounting portion can also include a vertical securing portion for vertically compressing the display panel within the housing.

The display alignment device can include a registration edge within the housing of the assembly. The registration edge is in communication with at least one alignment edge of the display panel such that the interface between the alignment edge and the registration edge aligns the imaging area with the display opening.

A combination on a display panel with the mounting apparatus forms a display assembly. The display assembly includes a housing having a display opening, a display panel mounted within the housing, and a display alignment device coupled to the housing. The display panel includes an imaging area positioned in optical alignment with the display opening. The display alignment device is capable of aligning the imaging area with the display opening.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 5 through 13 show a display assembly.

FIGS. 14 through 22 illustrate a display assembly having alternate housing structure.

FIGS. 23 through 31 illustrate a display assembly having an alternate housing structure.

DETAILED DESCRIPTION

Figure 1:
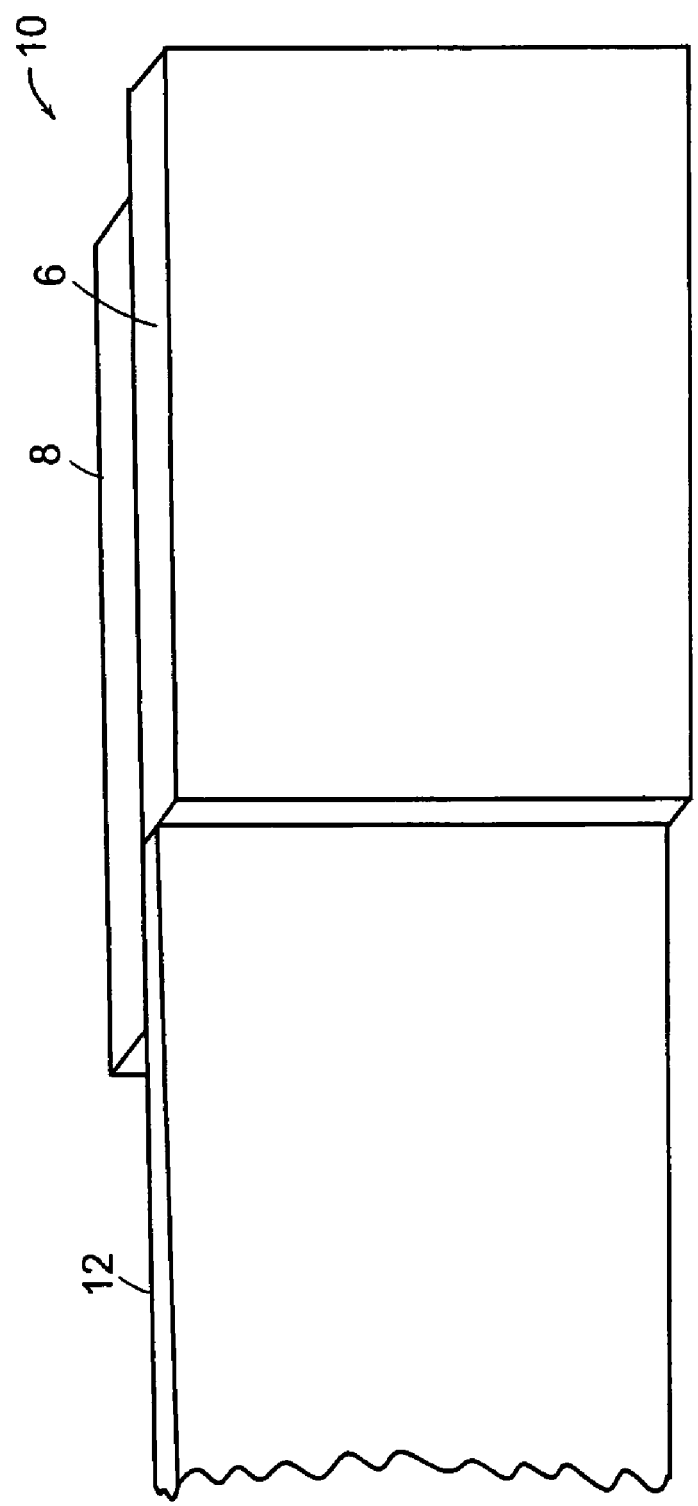
FIG. 1 illustrates a display panel of the prior art.

FIG. 1 illustrates a display panel 10 of the prior art. The display 10 includes a first glass substrate 6, a second glass substrate 8 and a cable connector 12 coupled to the display 10. The cable connector 12 provides a means to drive the display 10. Typically, polarizers are attached to the surfaces of the display panel 10. A first polarizer can be attached to the first glass substrate 6 of the display while a second polarizer is attached to the second glass substrate 8 of the display panel 10. Descriptions of the manufacturing assembly of displays are described in U.S. patent application Ser. No. 09/643,655 filed on Jul. 28, 2000, U.S. patent application Ser. No. 09/309,155 filed on May 10, 1999, and U.S. patent application Ser. No. 08/966,985 filed on Oct. 8, 1998, the entire contents of these applications being incorporated herein by reference.

Figure 2:
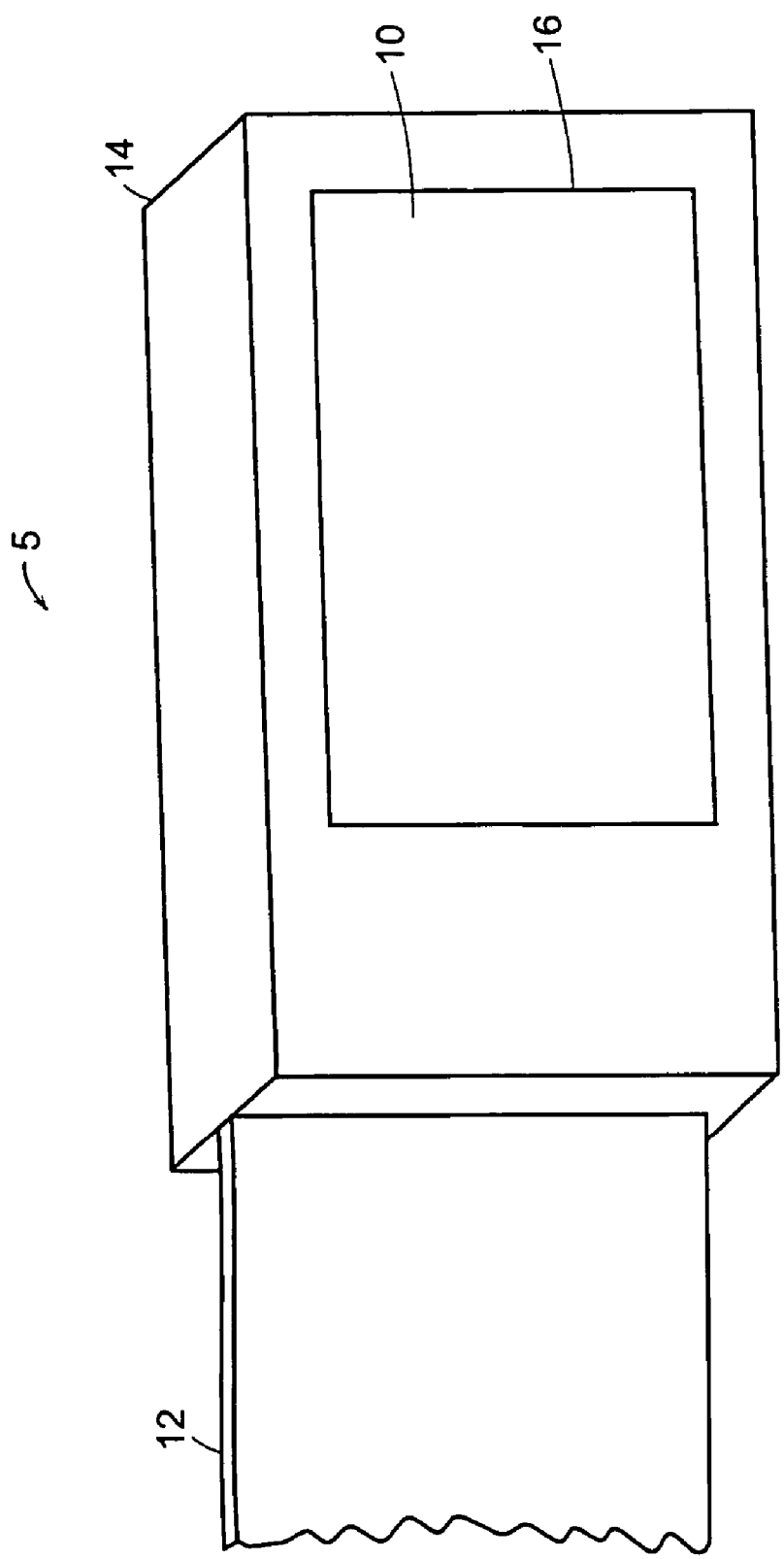
FIG. 2 illustrates the display panel of FIG. 1 mounted within a carrier.

FIG. 2 illustrates the display panel 10 located within a carrier 14 to form a display or display system 5. The carrier 14 includes a display opening 16 for the display panel 10. In manufacturing the display system 5, an active area of the display panel 10 is aligned with the display opening 16 of the carrier 14. This first alignment step provides the imaging area of the display to be viewable by a user through the opening 16 without any observed rotation of the image as produced by the display panel 10.

When the display system 5 is placed within a housing, such as a view finder housing, the carrier 14 acts to align the imaging area of the display system within the housing. This second alignment step can create tolerance error that can lead to overall poor alignment of the imaging area of the display 5 with an eye of a user.

In order to eliminate one of the alignment steps, the display 10 is mounted within the housing of a device without a carrier 14. By eliminating the carrier 14, the alignment of the display with the eye of a user is limited to one alignment step: that of aligning the display panel 10 within the housing of the device.

Figure 3A:
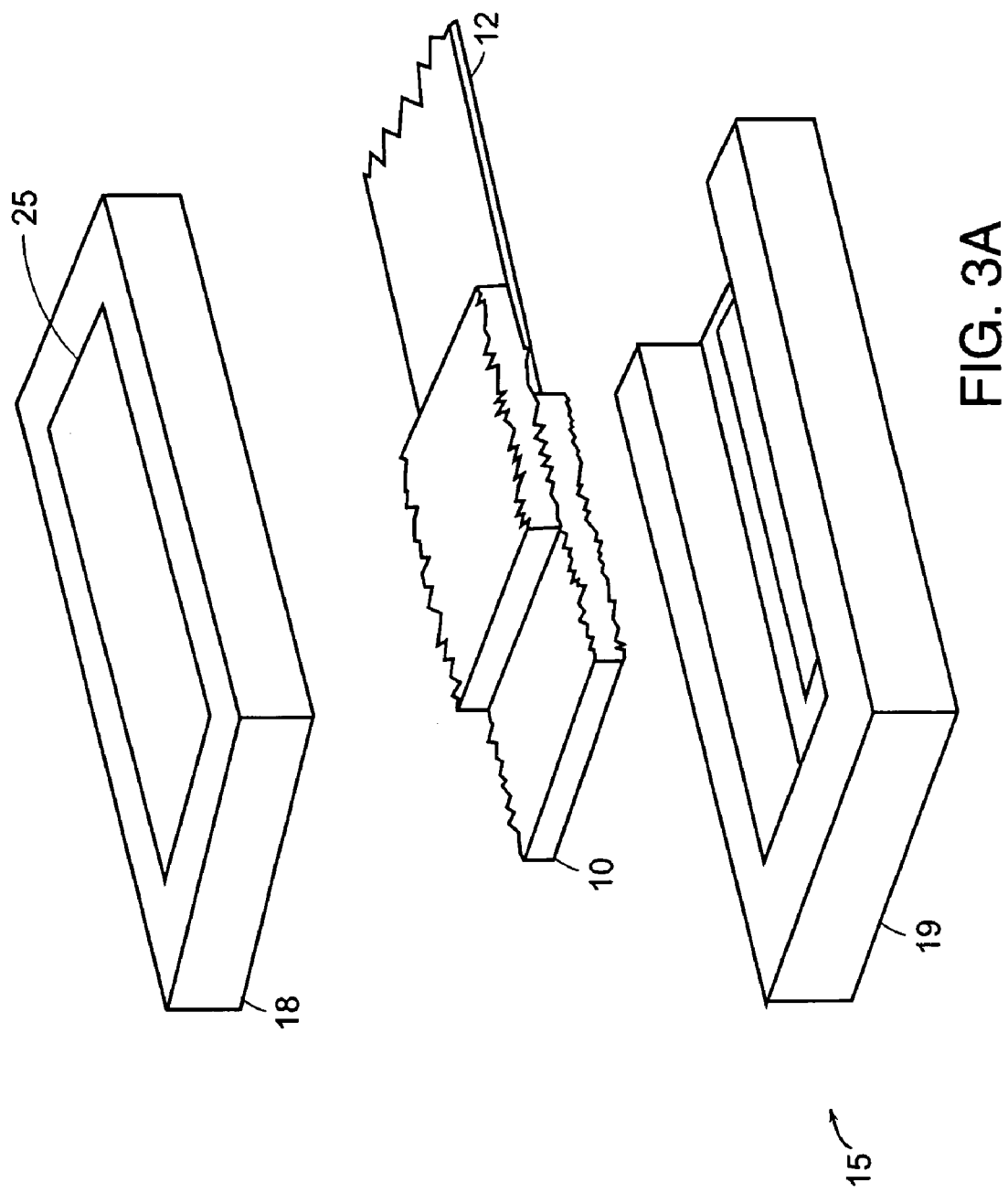
FIGS. 3A and 3B illustrate a display panel mounted within a housing.
Figure 3B:
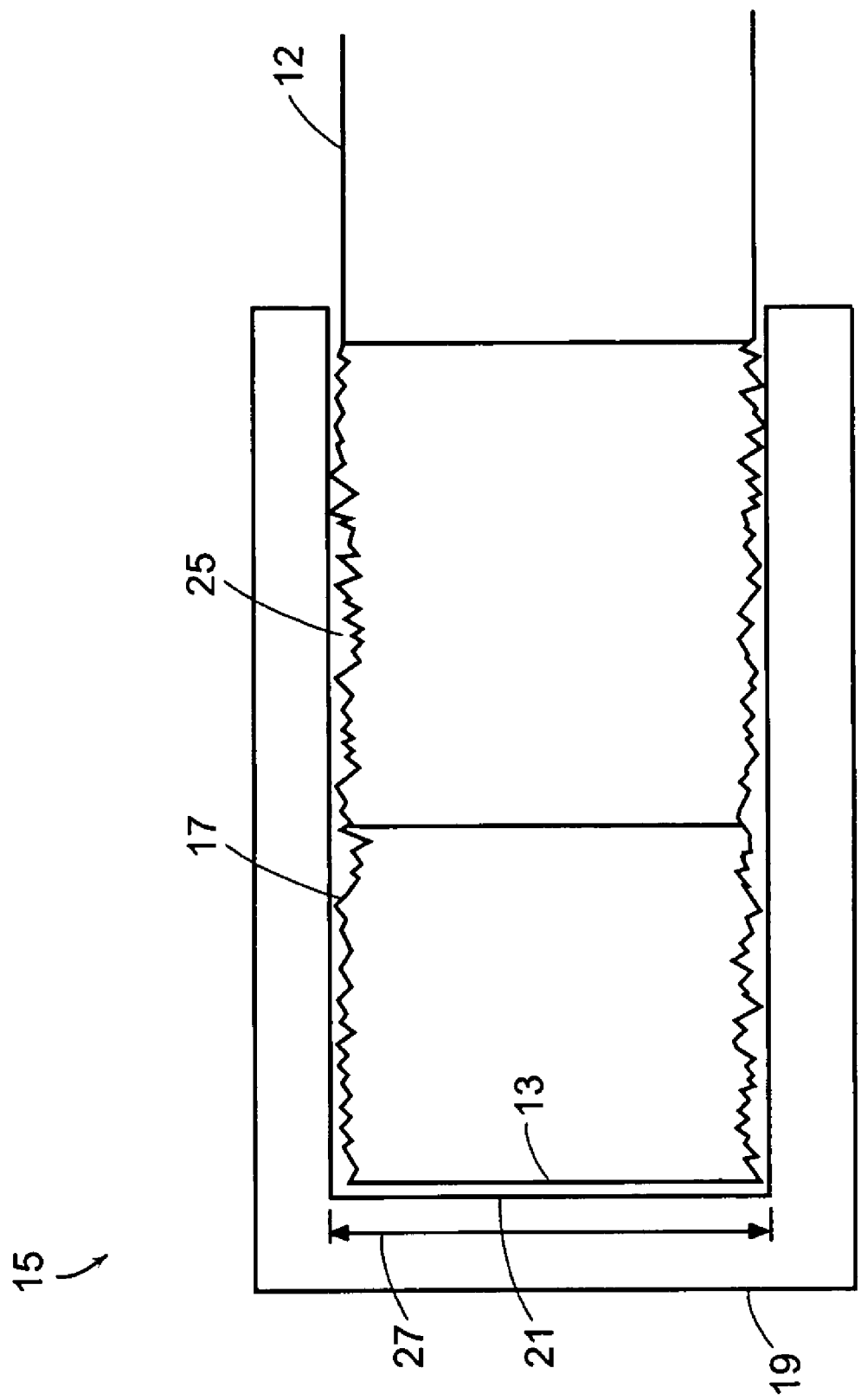

FIGS. 3A and 3B illustrate a display panel 10 without a carrier 14 mounted inside a mounting apparatus 15. The mounting apparatus 15 includes a housing having a first housing portion 18 and a second housing portion 19. The mounting apparatus 15 also includes a display opening 25 that allows transmission of light by the display panel 10. The mounting apparatus 15 also includes a display alignment device 21.

As is shown, the display panel 10 includes an alignment edge 13 and jagged or non-straight edges 17. The non-smooth or jagged edge 17 is created during scribing of the glass for the display panel 10. When the glass is cut to size for the display 10, the scribed edges are not to form flat edges. The edges include a plurality of protrusions. The display panel 10 also includes an aligned edge 13. The alignment edge 13 of the display panel 10 allows the panel 10 to be aligned within the mounting apparatus's such that there is minimal or no rotation of the display panel 10 with respect to the display opening 25 of the mounting apparatus 15. The mounting apparatus 15 is dimensioned such that the width 27 of the mounting apparatus 15 is larger than the largest protrusion along the jagged edge of the display panel 10. This allows the display panel 10 to be placed within the mounting apparatus 15 without interference between the display panel 10 and the mounting apparatus 15.

The mounting apparatus 15 includes a display alignment device 21 that aligns the imaging area of the display panel 10 with the display opening 25 of the housing. In particular, the display alignment device 21 aligns an imaging area of the display panel 10 with a tolerance of 2° or less from absolute alignment, that is 0°+/−1°, with respect to the display opening 25. As is shown in FIGS. 3A and 3B, the display alignment device 21 includes a registration edge that provides a linear coupling between the alignment edge 13 of the display panel 10 and the mounting apparatus 15. Coupling of the alignment edge 13 of the display panel 10 and the flat surface of the mounting apparatus 21 insures alignment of the imaging area display with the opening 25 of the housing. It is important to note that because the display panel 10 includes jagged edges 17, the flat surface of the alignment edge 13 of the display panel 10 is used to align the display within the housing. The interface between the alignment edge 13 of the panel 10 and the alignment device 21 of the housing 15 prevents rotation of the display panel 10 with respect to the display opening 25.

Figure 4:
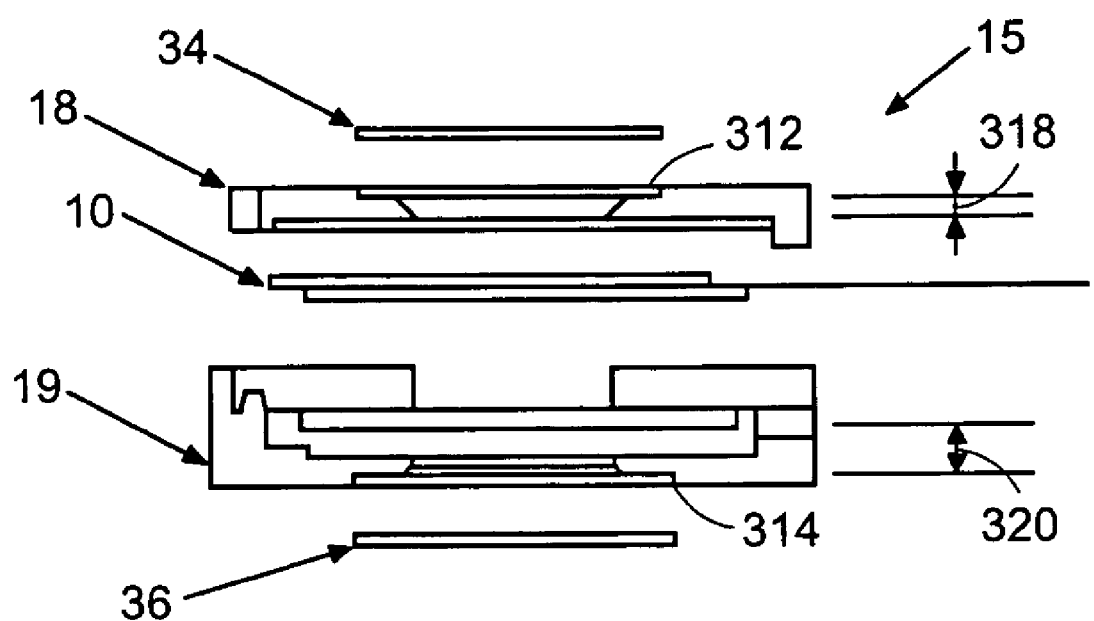
FIG. 4 shows a display panel mounted within a housing having polarizers attached to the housing.
Figure 5:
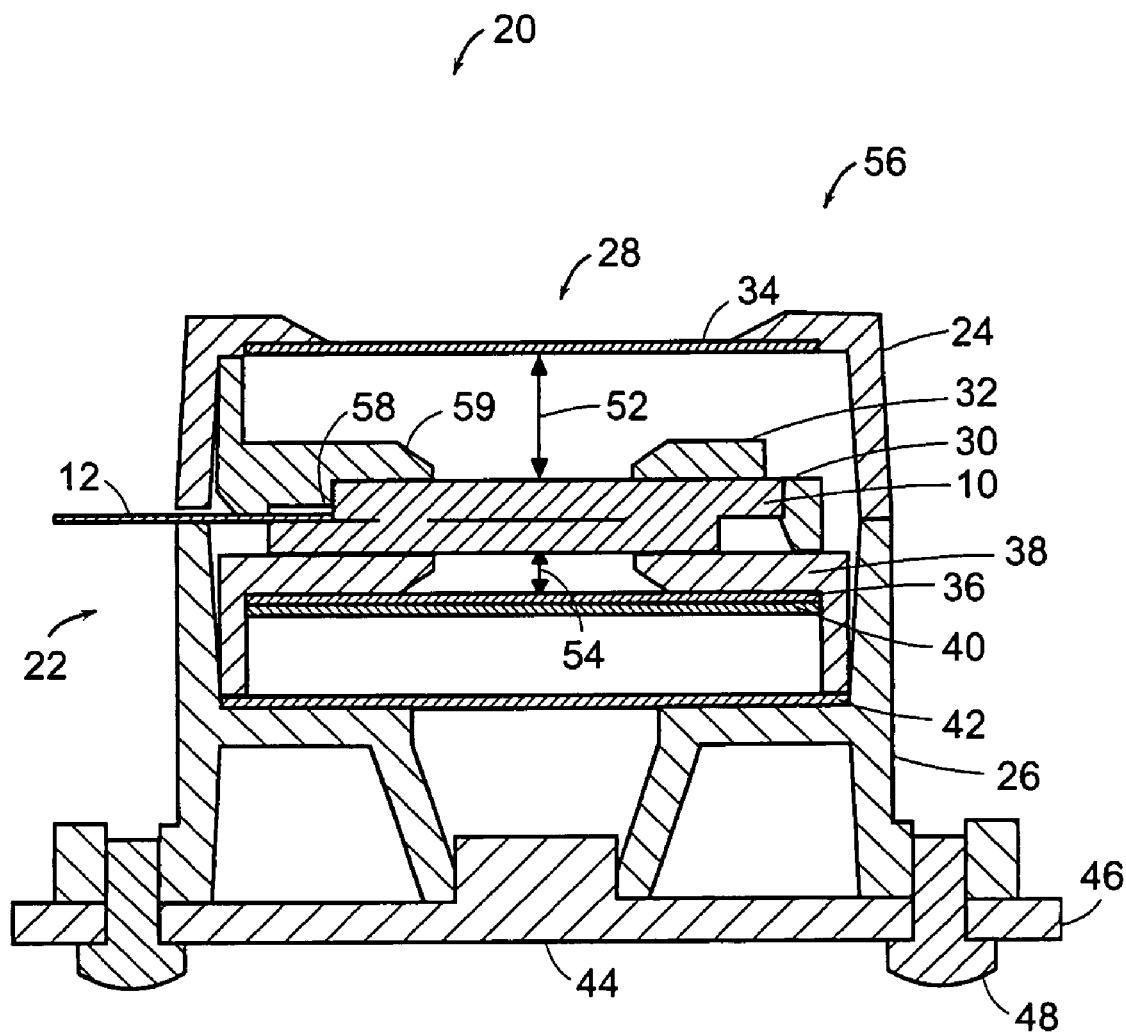
Figure 9:
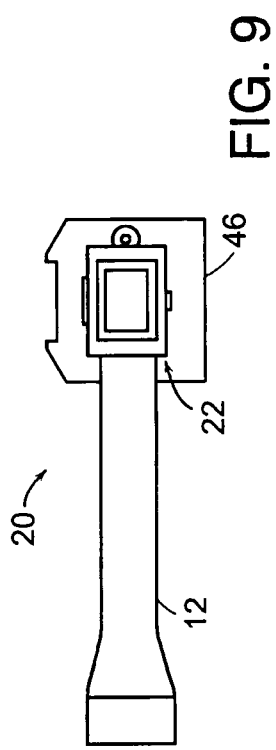
Figure 12:
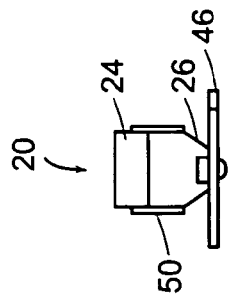
Figure 11:
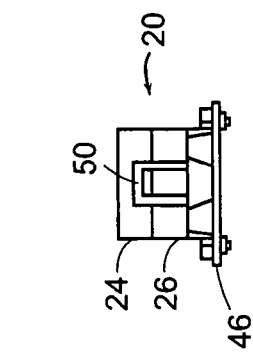
Figure 10:
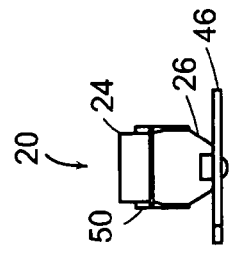
Figure 13:
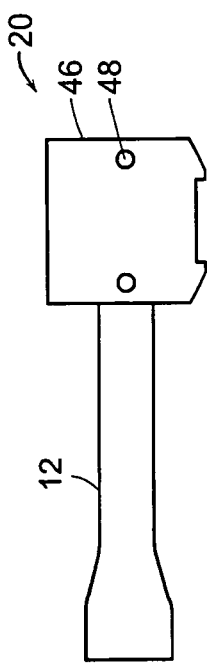
Figure 14:
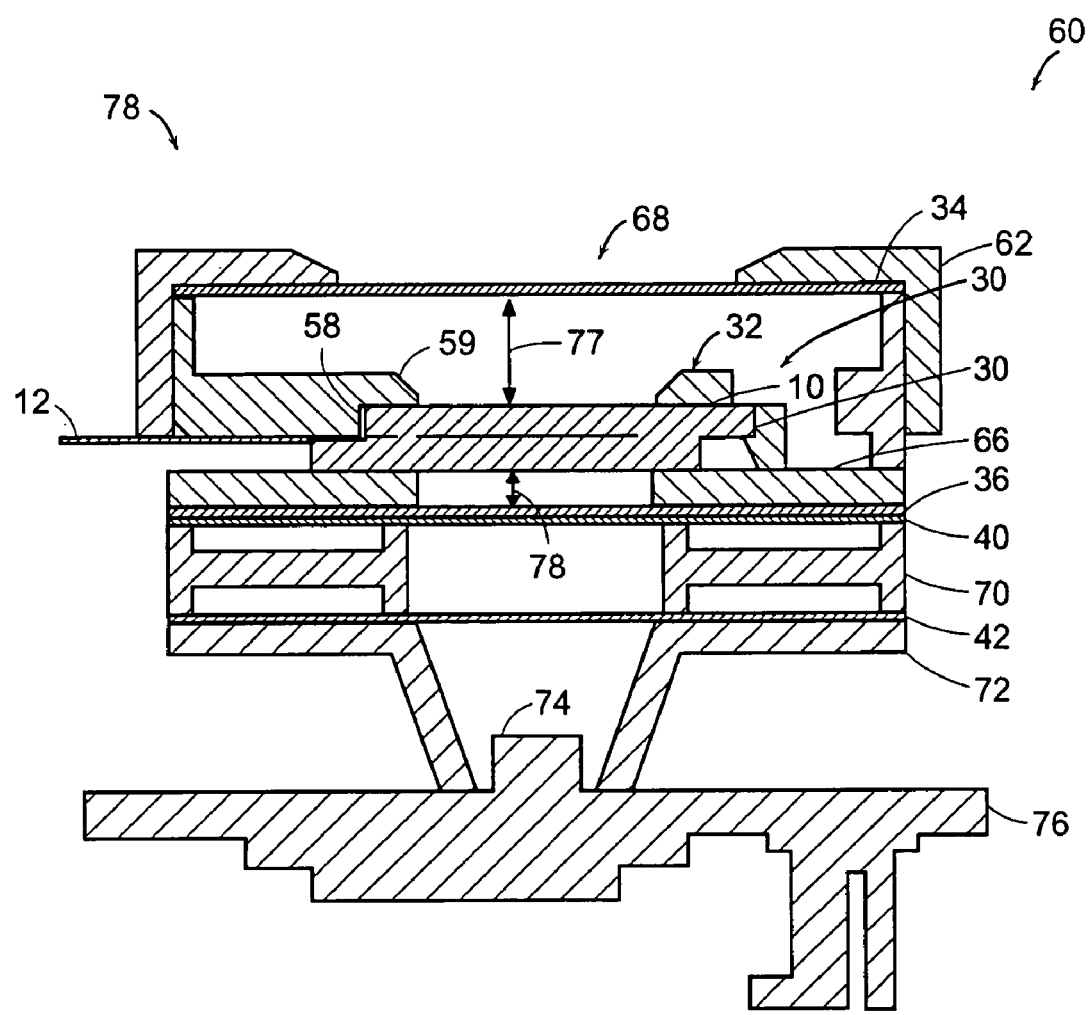
Figure 17:
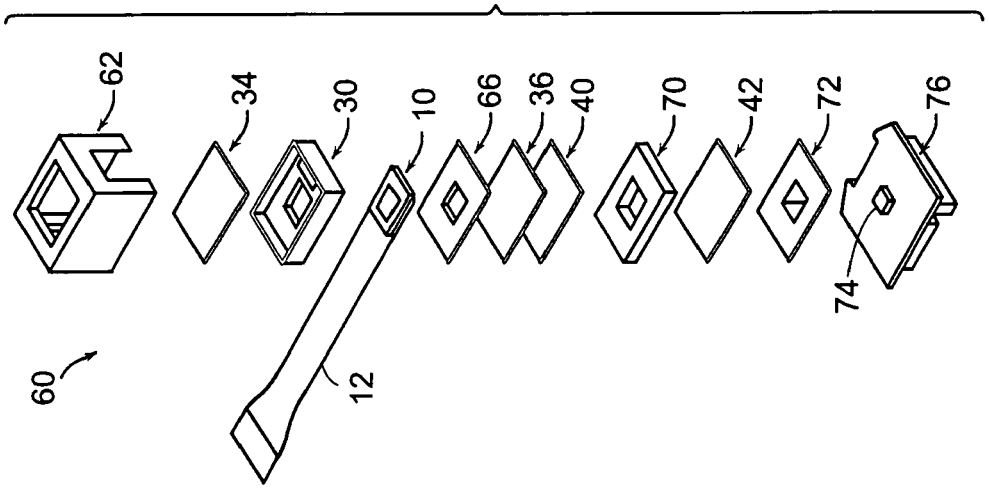
Figure 15:
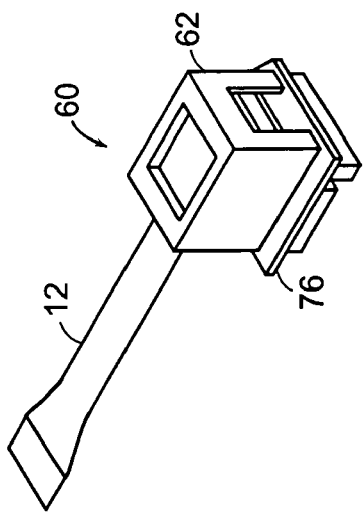
Figure 16:
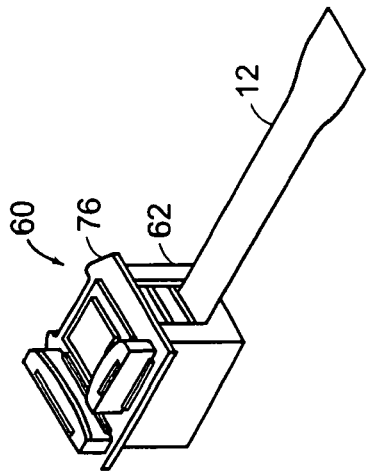
Figure 23:
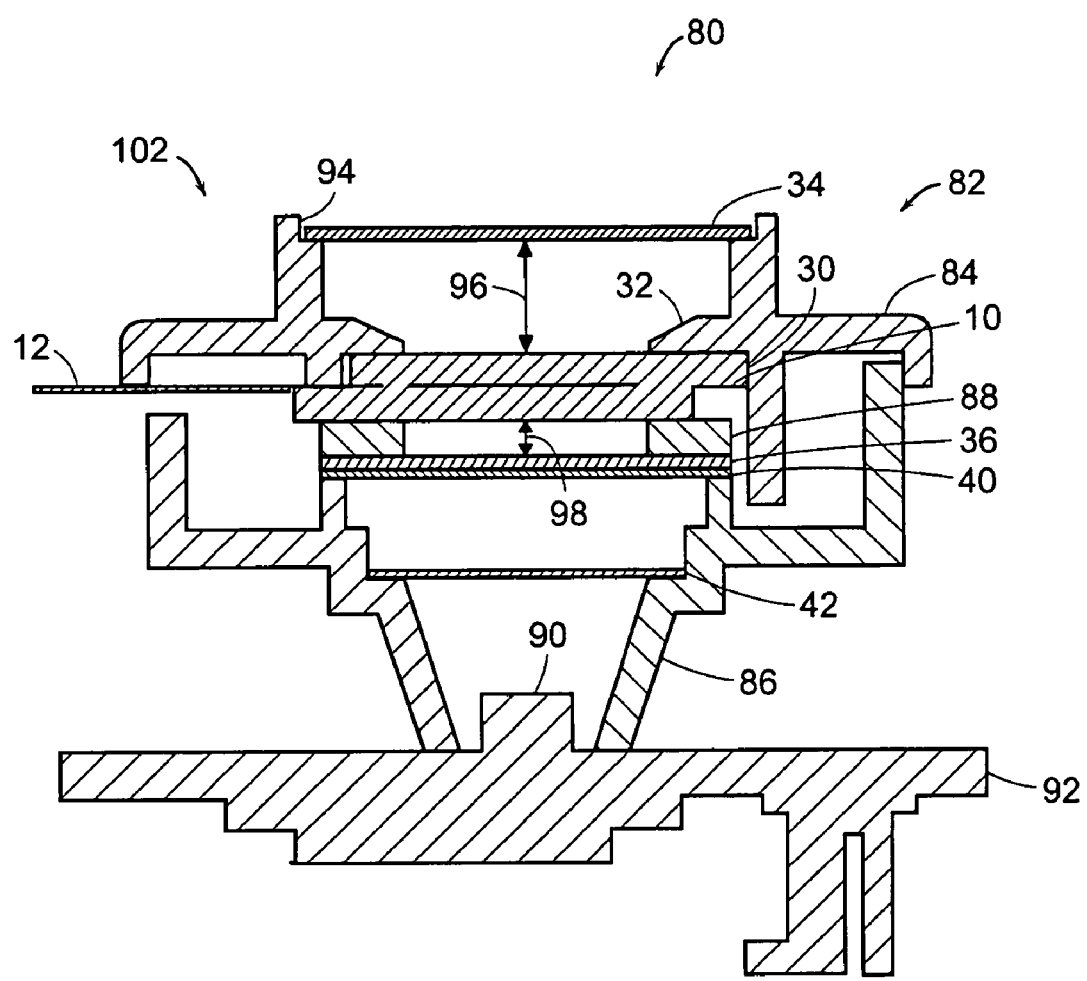
Figure 26:
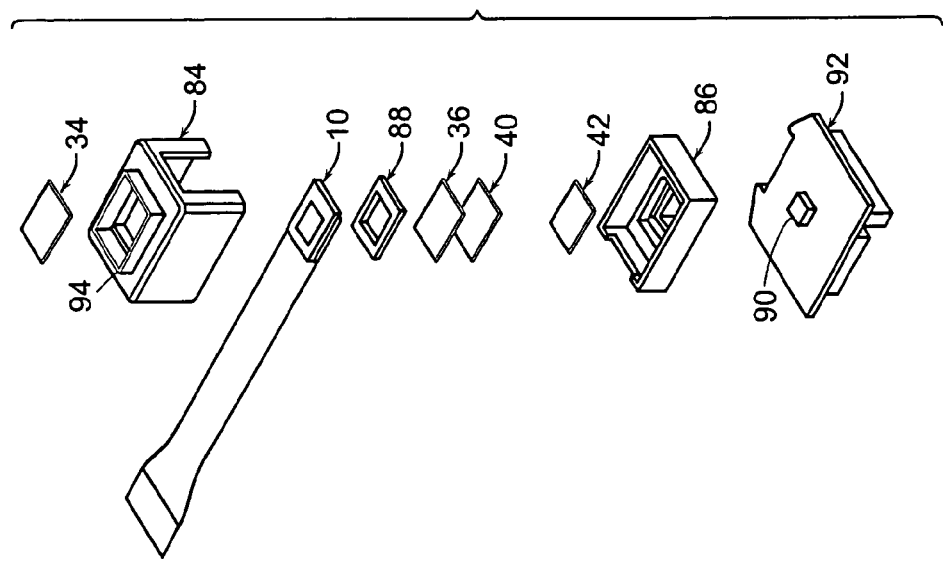
Figure 24:
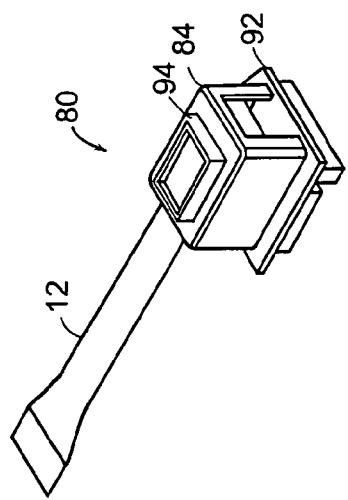
Figure 25:
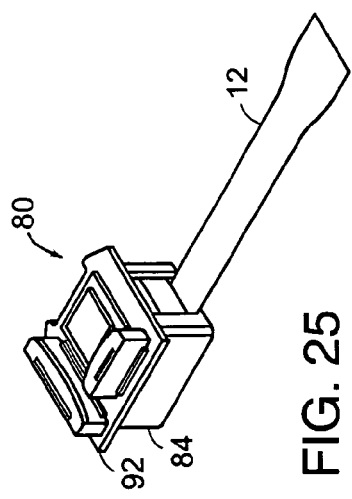

FIG. 4 illustrates a display panel 10 without a carrier mounted within a mounting apparatus 15 where the mounting apparatus 15 includes polarizers 34, 36. The mounting apparatus 15 includes a first polarizer or output (i.e. image transmitting) polarizer 34, a housing having a first housing element 18 and a second housing element 19, a display 10, and a second polarizer or input polarizer 36. In particular, the polarizers 34, 36 are coated with an anti-reflective coating to minimize reflections from a light source.

The output polarizer 34 is mounted within the first housing element 18 that includes a receptacle 312 used to hold the first polarizer 34 within the housing element 18. In particular, the receptacle 312 mechanically secures the first polarizer 34 with the housing 18 such than an adhesive is not required on the first polarizer 34. The receptacle 312 is positioned within the first housing element 18 such that a distance 318 is formed between the first polarizer 34 and a first surface of the display 10. This distance 318 separates the polarizer 36 from the first surface or glass substrate of the display 10 and moves the first polarizer 34 away from the image plane of the display 10, thereby decreasing the visibility of defects within the first polarizer 34.

The display 10 mounts and is aligned within the second housing element 19 such that attachment of the first housing element 18 to the second display element 19 encloses the display 10. The second display element 19 also includes a receptacle 314 to hold the second polarizer 36 within the housing 15. The receptacle 314 can position the second polarizer 36 at a distance 320 away from the display 10. The receptacle 314 mechanically secures the second polarizer 36 within the housing element 19 such that an adhesive is not required on the second polarizer 36. This distance 320 separates the second polarizer 36 from the surface or glass substrate of the display 10 and moves the second polarizer 36 away from the focal plane of the display 10, thereby decreasing the visibility of defects within the second polarizer 310.

In one embodiment, when the polarizers 34, 36 are secured within the receptacles 312 and 314, the distance between the polarizers 34, 36 and the image plane of the display panel 10 is approximately 1.5 mm from the image plane. The 1.5 mm includes 0.7 mm thickness of the display 10, measured from a surface of the display 10 to the center of the display 10, the image plane, and a gap of 0.8 mm.

FIGS. 5 through 13 illustrate a design for a display assembly 20. The display assembly 20 includes a housing 22 having a first housing portion 24 and a second housing portion 26. The second housing portion can be a backlight housing that holds a light source for the assembly 20. The housing 22 includes a display opening 28 and a display alignment device 30. The display alignment device aligns the display panel 10 with the display opening 28 within the housing 22. The display assembly 20 includes securing device 32 that prevents movement of the display panel 10 within the housing 22. The securing device 32 includes a lateral securing portion 58 that forces the alignment edge 13 of the panel 10 against the alignment device, thereby preventing rotation of the panel 10 in the housing 22. The securing device 32 also includes a vertical securing portion 59 that prevents vertical motion or tilting of the display panel 10 within the housing 22.

The display assembly 20 includes a first polarizer 34, which is a viewing side polarizer, and a second polarizer 36, which a light source side polarizer. The first polarizer 34 is mounted a first distance 52 away from the surface of the display panel 10 and the second polarizer 36 is mounted at a second distance 54 away from the light side surface of the panel 10. Mounting the polarizers 24, 36 away from the surfaces of the display panel 10 places the polarizers 34, 36 outside of the focal plane of a viewer and minimizes the effect that any defects or inclusions 10 the polarizers have as an image viewed by a user. The first polarizer 34 can be mounted to the first housing portion 24 that creates the first distance 52 between the display panel 10 and the first polarizer 34.

The housing 22 also includes a spacer 38, which is used to form the second distance 54 between the display 10 and the second polarizer 36. The second polarizer 36 and a first diffuser, mounted adjacent to the second polarizer 36 can be secured to the spacer 38. The display assembly 20 also includes a second diffuser 42 mounted within the second housing portion 26 of the housing 22. The second housing portion 26 can be coupled to a surface 46 having a light source 44 such as a circuit board. The housing 26 can be secured to the surface 46 by means of fasteners 48. The light source 44 provides light to the light source side of the display panel 10. In particular, the light source 44 is a light emitting diode (LED). The light source 44 can also be a blue light emitting diode surrounded by a cap having a phosphor coating. When the light emitting diode emits a blue light, the combination of the blue light from the light emitting diode and the phosphor coating can generate a white light for the display 10 assembly 20.

FIGS. 14 through 22 illustrate an alternate design of a display assembly 60. Display assembly 60 includes a single housing portion 62 having a display alignment device 30 that aligns the imaging area of a display panel 10 with an display opening 68 of the housing 62. The housing 62 includes a first polarizer 34, which is spaced at a first distance 77 away from the viewing side surface of the display panel 10. The housing 62 also includes a first spacer 66, which separates a second polarizer 36 from the light side of the display 10 by a second distance 78. The first spacer 66 can be made from a compliant material to prevent damage to the second polarizer. A first diffuser 40 is mounted adjacent to the second polarizer 36. A second spacer 70 between the second polarizer 30 and a light source housing 72. The second spacer 70 is used to secure the second polerizer 36 and first diffuser 40 within the display assembly 60 while separating the first diffuser 40 from a second diffuser 42.

The single housing portion 62 is coupled to a light source housing 72. The light source housing 72 is coupled to a surface such as a circuit board. The light source housing includes a light source 74, which can be an LED, to provide light for the display assembly 60.

FIGS. 23 through 31 illustrate an alternate design for a display assembly 80. The display assembly 80 includes a housing 82 having a first housing portion 84 and a second housing portion 86. The first housing portion 84 includes a polarizer mount 94, which is used to secure a first polarizer 34 to the display assembly 80. The polarizer mount 94 separates the first polarizer 34 from the viewing side surface of the display 10. By a first distance 96. The first housing portion 84 also includes a display alignment device 30. The first housing portion 84 also includes a securing device 32 that prevents movement of the display panel 10 within the housing. The assembly 80 includes a spacer 88 mounted between the display panel 10 and a second polarizer 36. The spacer 88 forms at a distance 98 between the light side surface of the display panel 10 and the second polarizer 36.

A first diffuser 40 is mounted adjacent to the second polarizer 36 and held adjacent to the polarizer 36 by the second housing portion 86. The second housing portion 86 also includes a second diffuser 42. The second housing portion is coupled to a surface 92, such as a circuit board, having a light source 90, which can be an LED.

Figure 32:
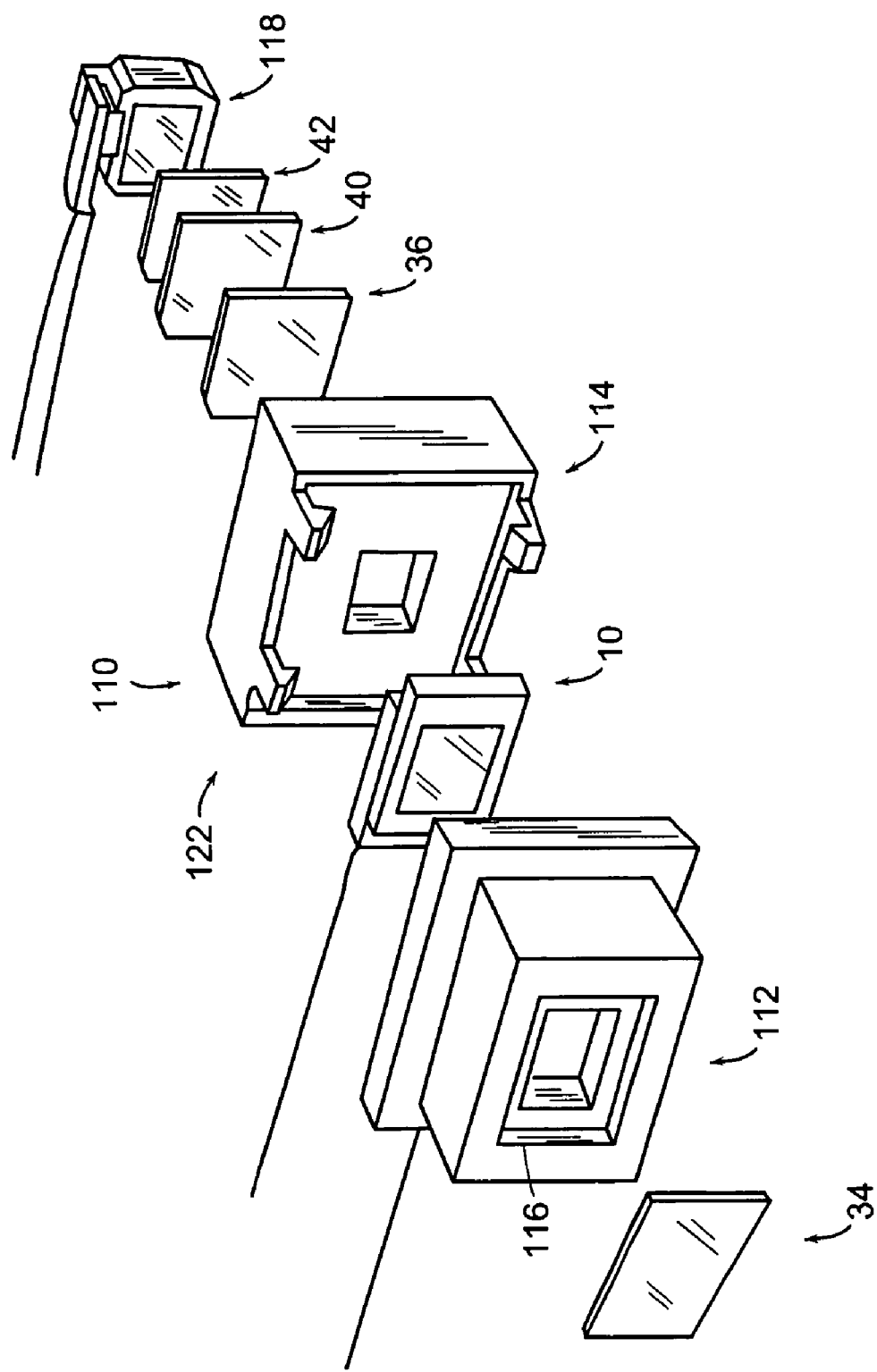
FIGS. 32 through 33 show a display assembly having an alternate arrangement for a polarizer, first diffuser and second diffuser within a display housing.
Figure 33:
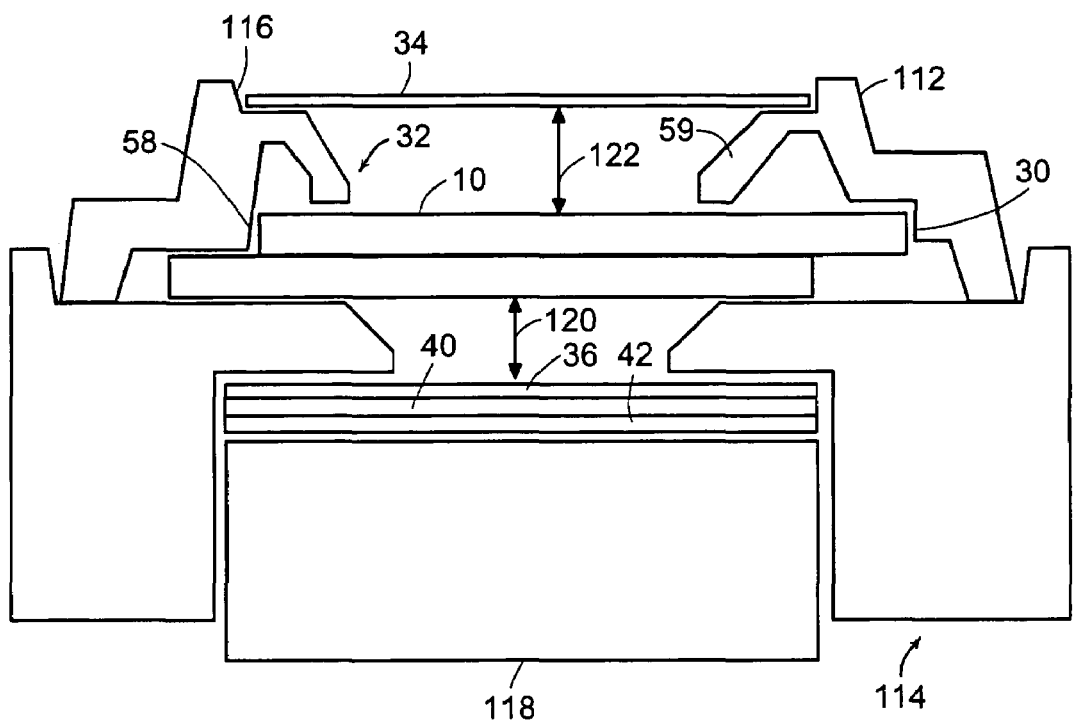

FIGS. 32 and 33 illustrate another display assembly design. The display assembly 110 includes a first housing portion 112 and a second housing portion 114. The first housing portion has a polarizer mount 116, to which a first polarizer 34 can be attached. The polarizer mount 116 separates the polarizer 34 from a surface of the display 10 by a first distance 122. The first housing portion also includes a display alignment device 30 and a securing device 32. The securing device 32 includes vertical securing portions 59 that abut the surface of the display panel 10 and prevent vertical movement of the display panel 10. The first housing portion attaches to the second housing portion 114 to secure the display 10 within the display assembly 110.

A light source 118 is mounted to the second housing portion 114 of the display assembly 110. In particular, the light source 118 is a light pipe. The light pipe can include a second polarizer 36, a first diffuser 40 and a second diffuser 42 stacked on the surface of the light pipe.

Figure 34:
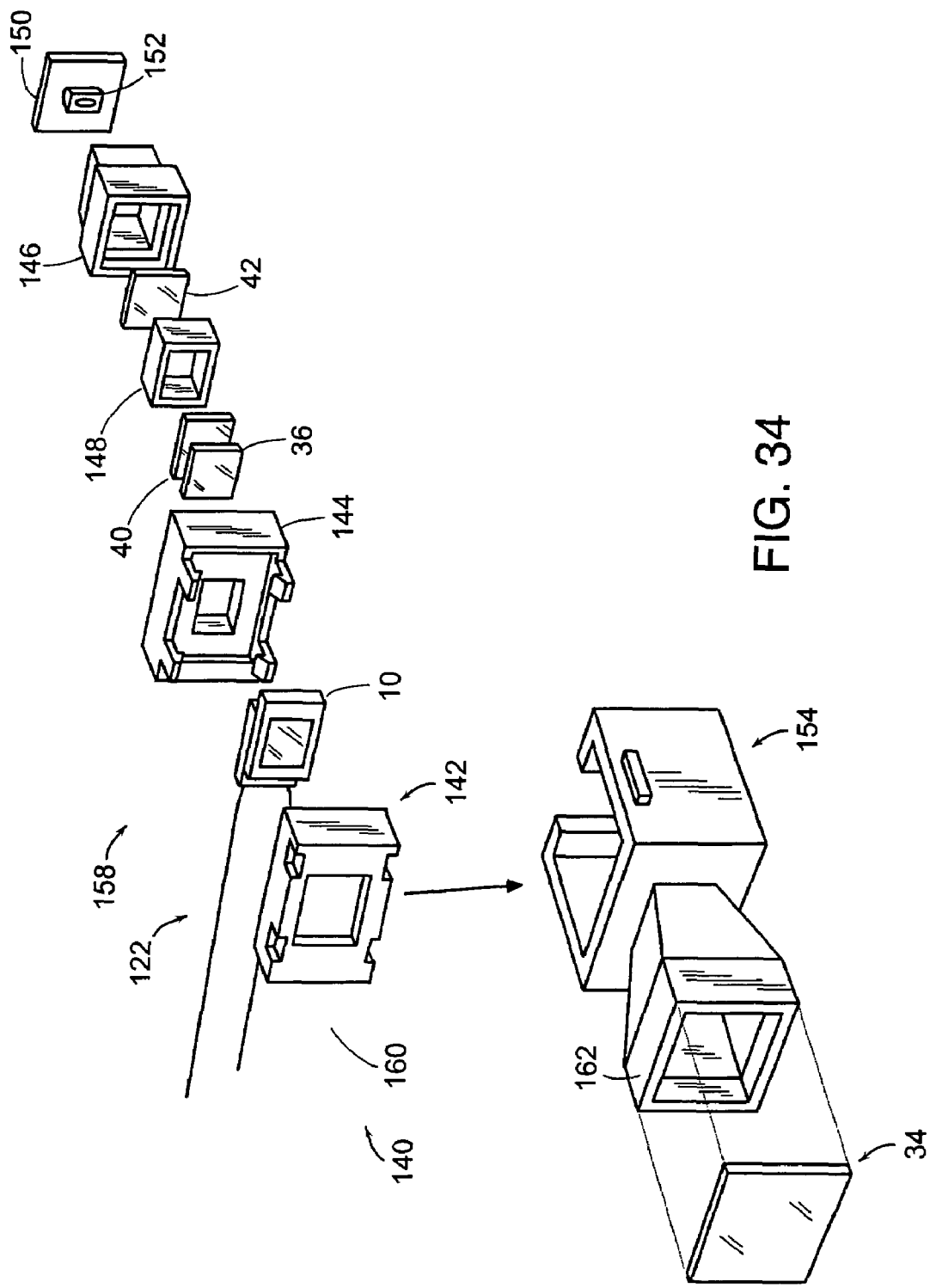
FIGS. 34 and 35 show an alternate display assembly configuration.
Figure 35:
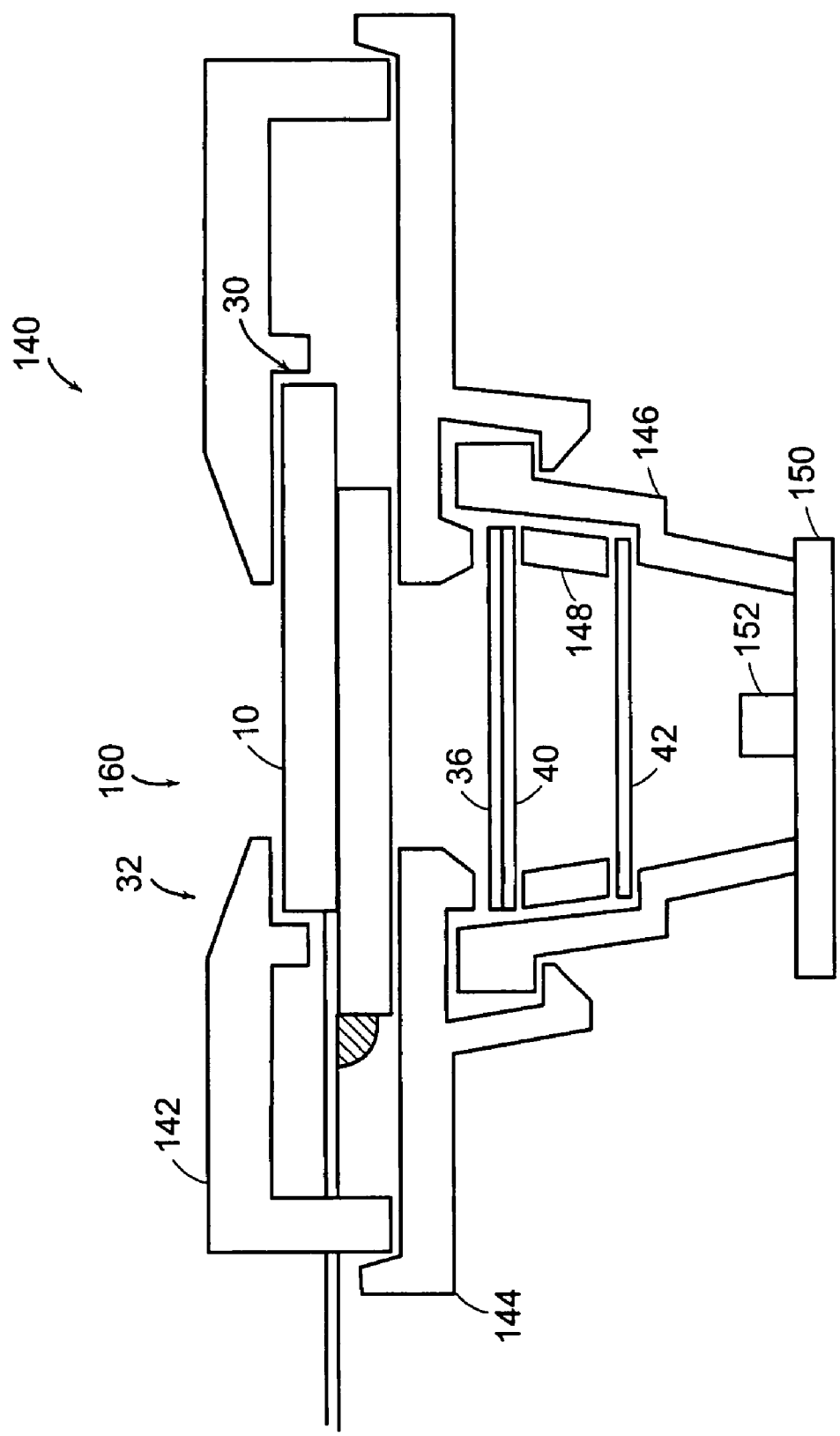

FIGS. 34 and 35 illustrate an alternate design for a display assembly 140. The display assembly 140 includes a first housing portion 142, a second housing portion 144 and a third housing portion 146. A display panel 10 is mounted between the first housing portion 142 and the second housing portion 144. The first housing portion 142 includes a display alignment device 30 and a securing device 32 to prevent lateral or vertical movement of the display panel 10 within the display assembly 140. A second polarizer 36 and a first diffuser 40 are mounted between the second housing portion 144 and the third housing portion 146. The display assembly 140 includes a spacer 148 located between the first diffuser 40 and the second diffuser 42. The second housing portion 144 couples to the third housing portion 146 to secure the second polarizer 36, the first diffuser 40 and the second diffuser 42 within the display assembly 140. The third housing portion 146 attaches to a surface 150 such as a circuit board. The surface 150 includes a light emitting diode 152.

The combination of the first housing portion 142, second housing portion 144 and third housing portion 146 along with the surface 150 form a sub-assembly that is placed within a display assembly housing 154. The display assembly housing 154 includes protrusion 162. The protrusion 162 secures a first polarizer 34 to the display assembly housing 154 and separates the first polarizer 34 from a viewing surface of the display panel 10.

Figure 36:
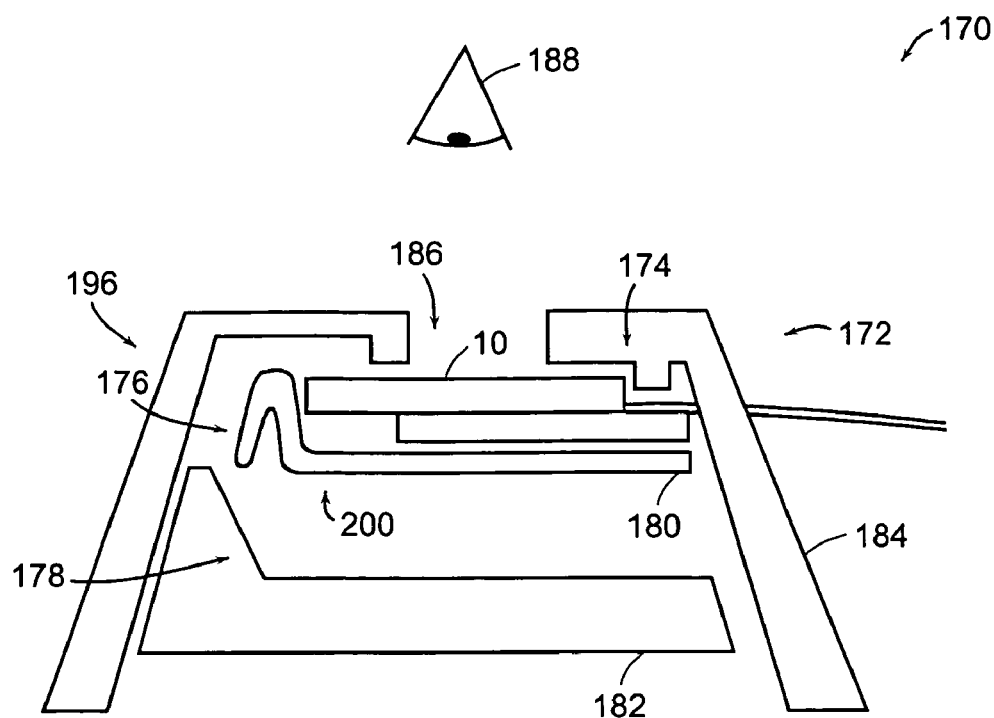
FIGS. 36 and 37 illustrate an alternate display alignment device.
Figure 37:
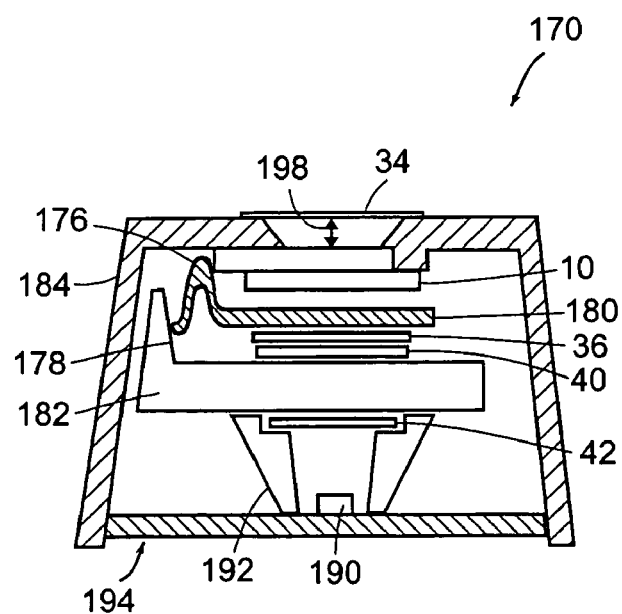
Figure 38:
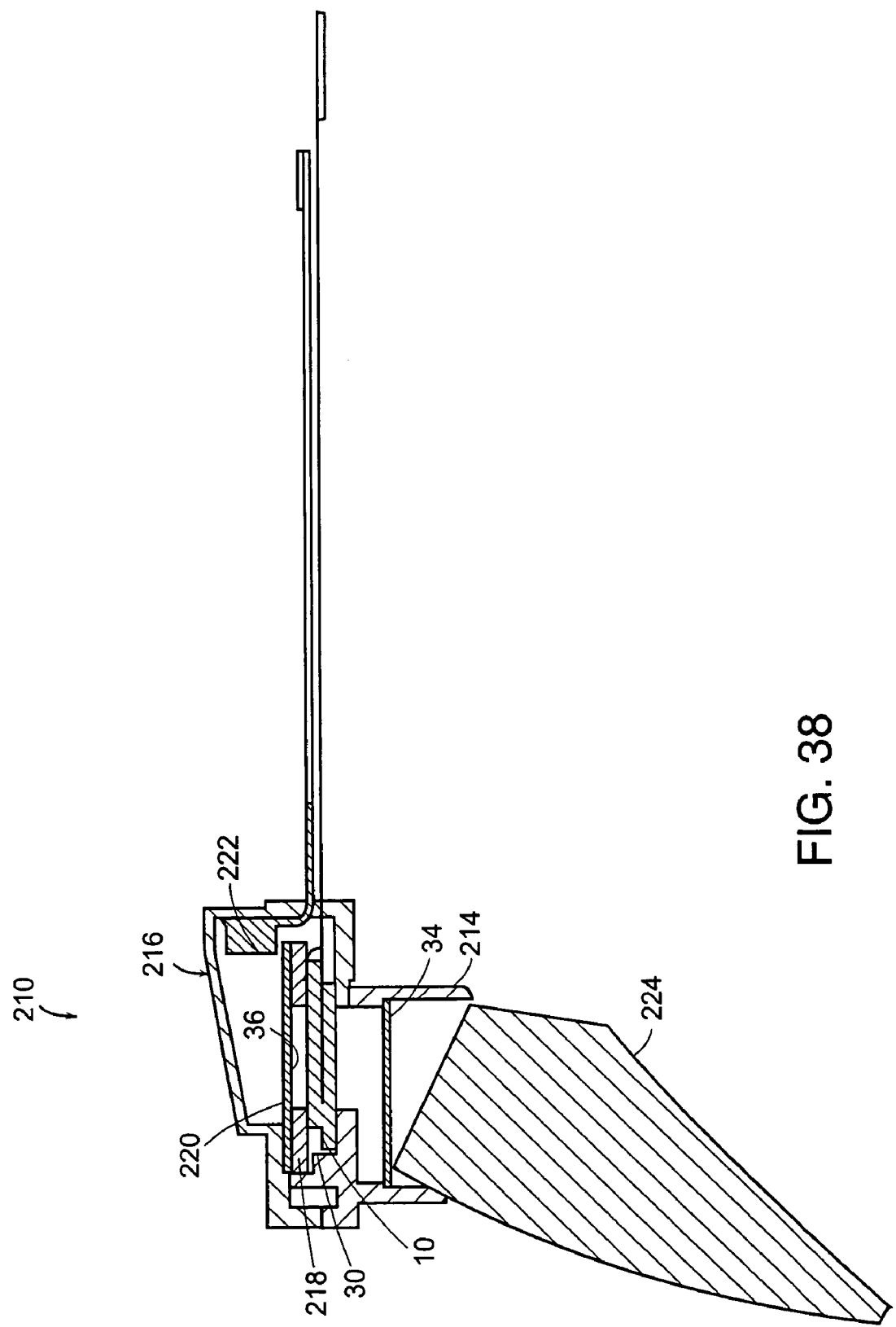
FIGS. 38 through 46 show a display assembly having a torro lens coupled to a display housing.
Figure 40:
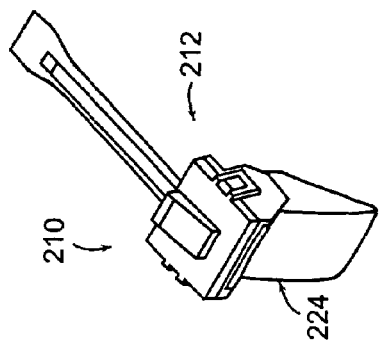
Figure 41:
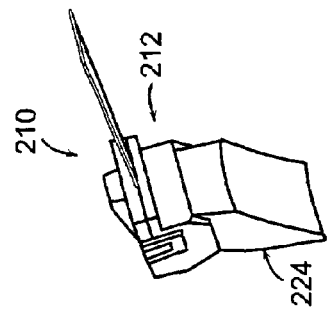
Figure 39:
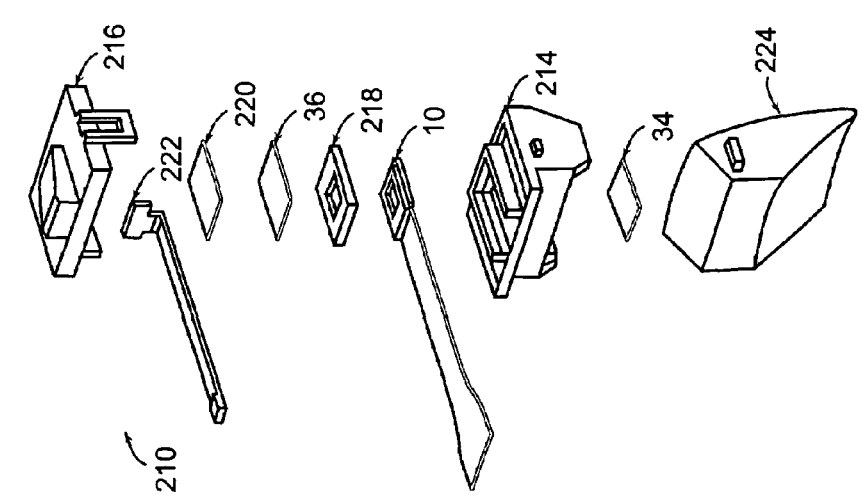
Figure 43:
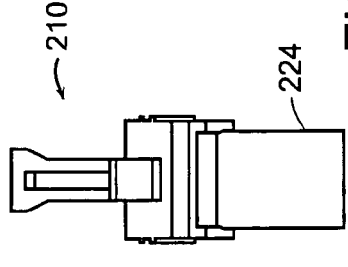
Figure 45:
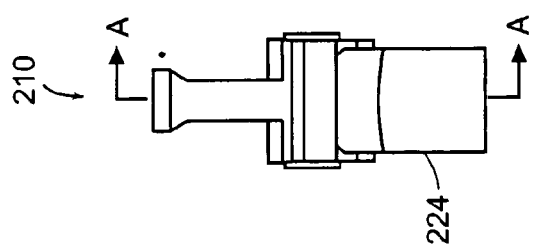
Figure 42:
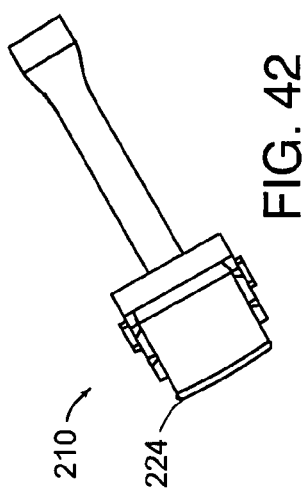
Figure 44:
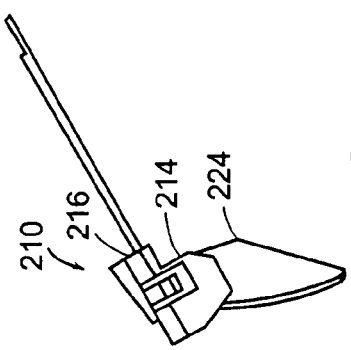

FIGS. 36 and 37 illustrate an alternate lateral securing portion for a display 10. FIG. 36 illustrates a detailed view of the lateral securing portion 172. The lateral securing portion 172 is formed as part of the display assembly 170. The display alignment device 30 includes an alignment edge 174 of the display assembly 170 that abuts the display 10 to prevent rotation of an imaging area of the display panel with respect to a display opening 186 of the housing 184. The lateral securing portion 172 also includes a support or a platform 180 having a spring 176. The spring 176 and support 180 form a mounting apparatus 200 for the display 10. The lateral securing portion 172 further can include a spacer portion 182 having a ramp or incline portion 178. The spacer 182 allows light from a light source to travel to the display panel 10. The ramp 178 is used to force the spring 176 and the support 180 against the display 10 to secure the display against the alignment edge 174 of the housing 184.

In order to align an active area of the display 10 with the display opening 186 using the lateral securing portion 172, the display 10 is first placed within the housing 184. An alignment edge of the display panel 10 is placed against the display alignment device 30, which is an alignment edge 174 of the housing 184, to initially align the display panel 10 and the imaging area of the display with the display opening 186 of the housing 184. The display panel 10 is supported by the support 180 of the mounting apparatus 200. Next, the spacer 182 and ramp 178 assembly are vertically compressed against the display 10 and mounting apparatus 200. The ramp portion 178 compresses the spring portion 176 of the mounting apparatus. This compression forces the spring 176 against the display panel 10 that, in turn, forces the display panel 10 against the alignment edge 174 and ensures proper orientation of an imaging area of the display panel 10 with the display opening 186. Furthermore, the spacer 182 is forced against the support 180, which prevents the display panel 10 from tilting within the housing 184.

FIG. 37 illustrates a display assembly 140 having a first polarizer mounted on an outside portion of the housing 184 to create a first distance 198 between the display 10 and the first polarizer 34. The spacer 182 and the support 180 each include a means to allow the light from a light source to travel to the display panel 10. The display assembly 170 also includes a second polarizer and a first diffuser located between the spacer 182 and the support 180. The support 180 separates the first polarizer 36 and the light side of the display panel 10. The display assembly 170 also includes a light source 190 attached to a mounting surface 194. The mounting surface can be a circuit board, for example. The light source 190 is mounted with a reflector to concentrate the light from the light source towards the display 10. A second diffuser 42 is located between the support platform 180 and the light source 190 and can be mounted to the reflector 192.

FIGS. 38 through 46 illustrate the coupling of a display assembly to a lens. In particular, the lens allows bending of light emitted from the display such that the light is directed from the display towards a user's eye at some angle from the display.

FIGS. 38 through 45 illustrate a display assembly 210. Display assembly 210 includes a housing 212 having a first housing portion 214 and a second housing portion 216. The housing 212 includes a display panel 10 and an alignment device 30. The display assembly 210 also includes a spacer 218 to separate a second polarizer 36 and a diffuser 220 from the viewing surface of the display panel 10. The display assembly 210 also includes a first polarizer 34 separated from the viewing side of the display 210 by the first housing portion 214. The housing includes a lens 224 to magnify an image from the display 10. In particular, the lens 224 can direct light from the display towards a viewer's eye whin the user's eye is not located along the same axis as the light emanating from the display. In particular, such a lens is a torro lens.

Figure 46:
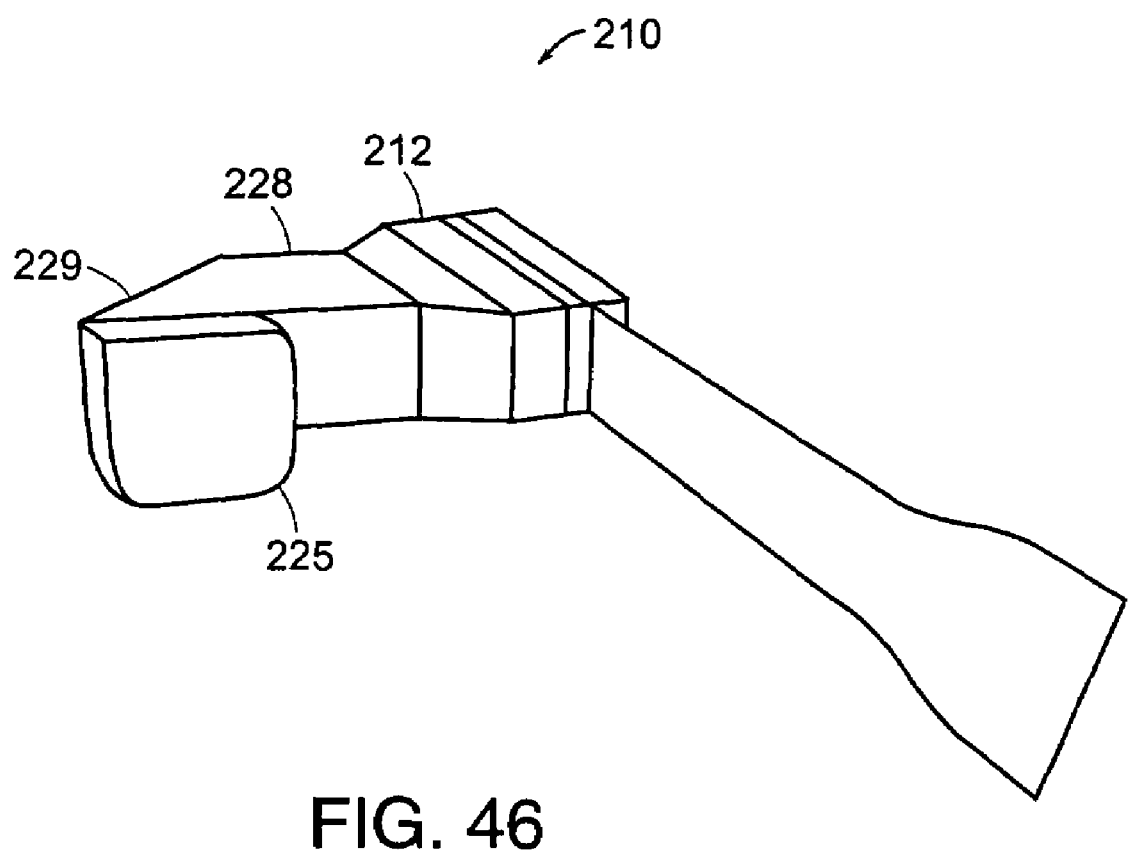

FIG. 46 illustrates an alternate design to direct light from a display assembly and towards a user's eye. FIG. 46 illustrates a display assembly 210 having a housing 212. The housing 212 is attached to a light pipe 228 where the light pipe 228 carries light from the display panel 10 within the display assembly 210 and transmits the light towards a light bending device 229. For example, light bending device 229 can be a prism or a mirror. The light bending device 229 directs light from the display towards a lens 225, which magnifies the image from the display. In particular, the light bending device 229 directs the light at a 90 degree angle from the direction of transmission of the light from the display or relative to the direction of transmission of light from the display. However, any angle greater than zero or less than 90 degrees, for example, can be used.

Figure 47:
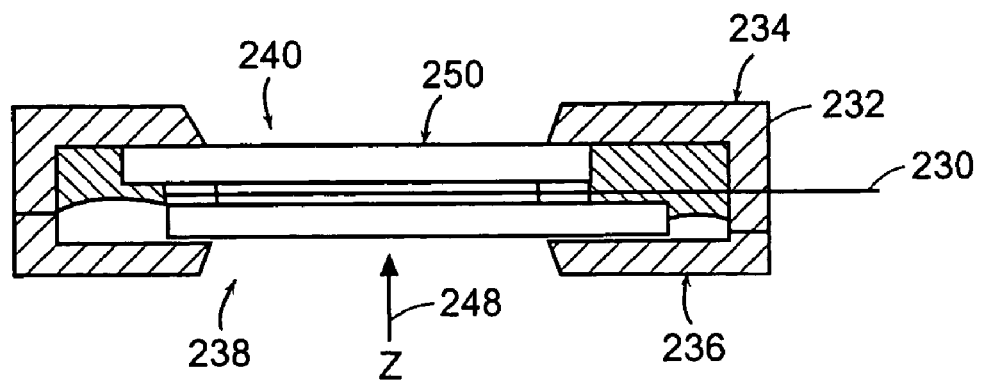
FIGS. 47 through 50 illustrate a display having an optically transparent coupler.

FIGS. 47 through 50 illustrate a device to prevent rotational misalignment of a display within a housing. FIG. 47 illustrates a display 250 mounted within a carrier 232. The carrier includes a first carrier portion 234 and a second carrier portion 236. The display 250 includes a viewing side 240 and a light source side 238. When placing the display 250 and carrier 232 within a housing, because of poor tolerancing or poor alignment, the imaging plane 230 of the display 250 can form an angle relative to the Z-axis 248 of the housing. This will cause distortion in the image as perceived by a viewer. Poor alignment of optics to the carrier 234 provides errors in the location of the image plane due to tolerance stack-up of parts. This can cause a focus error in translation along and tilt from the Z-axis 248.

Figure 48:
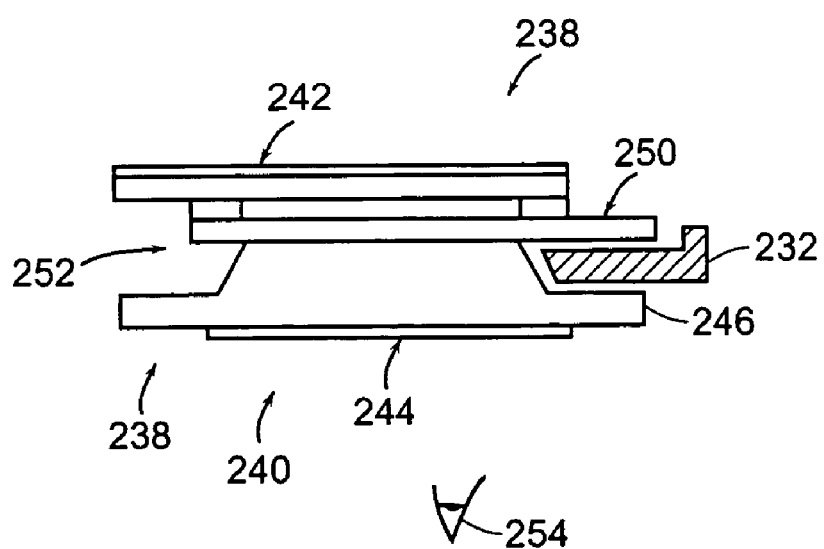

In order to prevent tolerance stack up or tilt relative to the Z-axis, an optically transparent spacer 246 is used that extends from a surface of the display 250 and is available for optical use within a housing. For example, FIG. 48 illustrates one use of the optically transparent spacer 246. Here, the optically transparent spacer 246 is secured to the viewing side of the display 250. This allows direct alignment of optics with the image plane 230 of the display 250. The only area where tolerance would affect the displayed image is with the tolerance of the optically transparent spacer itself 246. In the embodiments shown, a first polarizer 242 is secured to the viewing side 238 of the display 250. The optically transparent spacer 246 is secured to the viewing side 240 of the display 250. A second polarizer 244 is then secured to the optically transparent spacer 246.

The optically transparent spacer 246 can be made from either glass or plastic. The optically transparent spacer 246 also includes a gap portion 252 such that a first surface of the spacer 246 can clear the thickness of the carrier 236 and such that a second surface of the spacer 246 extends past the carrier 232.

Figure 49:
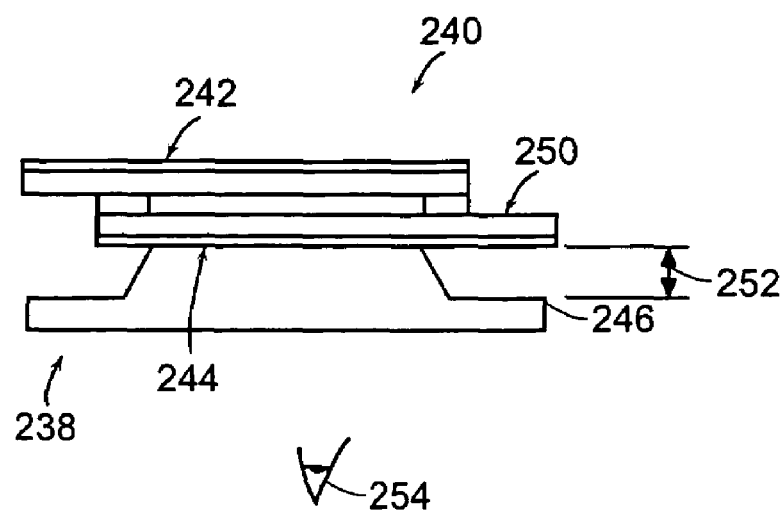

FIG. 49 illustrates an alternate design of the display 250 with the optically transparent spacer 246. In this design, the second polarizer 244 is mounted directly to the viewing side 240 of the display 250.

Figure 50:
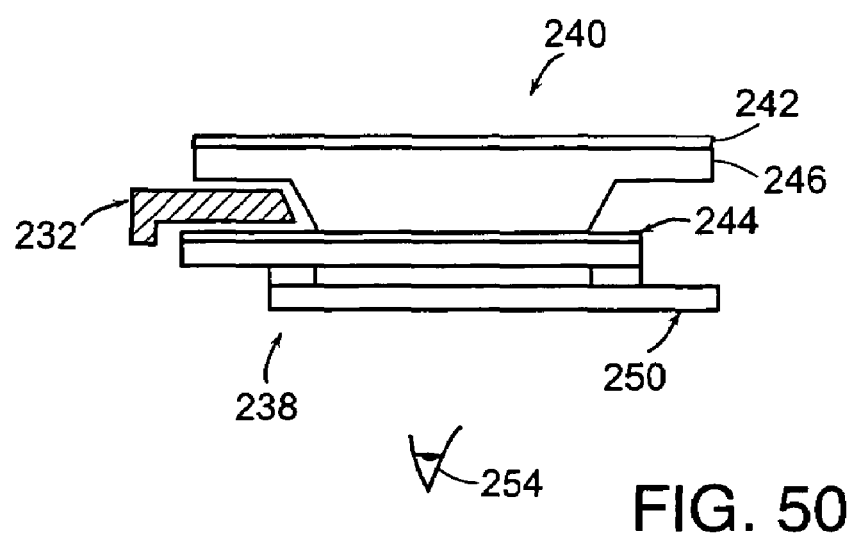

FIG. 50 illustrates another alternate design of the combination between the display 250 and the spacer 246. In this design, the spacer 256 is attached to the backlight side 240 of the display 250. This variation keeps the optically transparent spacer 246 from interfering with imaging optics that are used on the viewing side 238 of the display 250. The spacer 246 can include a first polarizer 242 mounted to the surface of the spacer 246. A second polarizer 244 is located between the light source side 240 of the display 250 and between the display 250 and the spacer 246. Some loss of brightness can result in this arrangement of the spacer 246 and the display 250. However, the loss of brightness can be compensated by increasing power to the backlight. Therefore, any loss in brightness would not show up as a loss of Modulation Transfer Function (MTF) in the image presented to an eye 254. With this arrangement, both Z-axis preventing any translation along the Z-axis or tilt relative to the Z-axis 248 is minimized. When bonding the optically transparent spacer 246 to the display 250 an index matching optical adhesive can be used.

While this invention has been particularly shown and described with references to particular embodiments thereof, it will be understood by those skilled in the art that various changes in form and details may be made therein without departing from the scope of the invention encompassed by the appended claims.

What is claimed is:

1. A mounting apparatus for a matrix display panel, the display panel having a glass substrate with some nonuniform outer dimensions and an alignment edge, the display panel including an imaging area, the alignment edge being aligned with the imaging area, the apparatus comprising:
   a housing having a display opening; and
   a display alignment device coupled to the housing, the display alignment device having a continuous linear registration edge and aligning the imaging area of the matrix display panel with the display opening of the housing based on direct continuous contact between the registration edge of the display alignment device and the alignment edge, the display alignment device and the housing compensating for said nonuniform outer dimensions.

2. The mounting apparatus of claim 1 wherein the display alignment device aligns the imaging area within a tolerance of 2° with respect to alignment with the display opening.

3. The mounting apparatus of claim 1 comprising a light source attached to the housing for illuminating the imaging area.

4. The mounting apparatus of claim 3 wherein the light source comprises a light emitting diode(LED).

5. The mounting apparatus of claim 4 wherein the LED emits a blue light, which is transmitted through a phosphor coating to generate a white light.

6. The mounting apparatus of claim 3 wherein the light source comprises a light pipe.

7. The mounting apparatus of claim 3 wherein the light source comprises a first diffuser and a second diffuser.

8. The mounting apparatus of claim 1 further comprising a lens mounted to the housing, the lens positioned adjacent to the display opening.

9. The mounting apparatus of claim 8 wherein the lens comprises a torro lens.

10. The mounting apparatus of claim 1 further comprising a lateral securing portion, the lateral securing portion laterally compressing the alignment edge of the matrix display panel against the display alignment device to align the imaging area with the display opening.

11. The mounting apparatus of claim 10 wherein the lateral securing portion comprises a spring and ramp combination.

12. The mounting apparatus of claim 1 further comprising a vertical securing portion, the vertical securing portion vertically compressing the matrix display panel within the housing.

13. The mounting apparatus of claim 1 wherein the display alignment device comprises the registration edge within the housing of the assembly, the registration edge in communications with the alignment edge of the matrix display panel such that the interface between the alignment edge and the registration edge aligns the imaging area with the display opening.

14. The mounting apparatus of claim 1 wherein the display panel is optically aligned with a polarizer.

15. A display comprising:
   a housing having a display opening;
   A matrix display panel mounted within the housing, the display panel having an imaging area positioned in optical alignment with the display opening, and a glass substrate with some nonuniform outer dimensions and an alignment edge, the alignment edge being aligned with the imaging area; and
   a display alignment device coupled to the housing, the display alignment device having a continuous linear registration edge and aligning the imaging area with the display opening based on direct continuous contact between the registration edge of the display alignment device and the alignment edge, the display alignment device and the housing compensating for said nonuniform outer dimensions.

16. The display assembly of claim 15 wherein the display alignment device aligns the imaging area within a tolerance of 2° with respect to the alignment of the display opening.

17. The display assembly of claim 15 comprising a light source coupled to the housing for illuminating the imaging area.

18. The display assembly of claim 17 wherein the light source comprises a light emitting diode(LED).

19. The display assembly of claim 17 wherein the LED emits a blue light, which is transmitted through a phosphor coating to produce a white light.

20. The display assembly of claim 17 wherein the light source comprises a light pipe.

21. The display assembly of claim 17 wherein the light source comprises a first diffuser and a second diffuser mounted to the housing.

22. The display assembly of claim 15 further comprising a lens mounted to the housing, adjacent to the display opening.

23. The display assembly of claim 22 wherein the lens comprises a torro lens.

24. The display assembly of claim 15 further comprising a lateral securing portion, the lateral securing portion laterally compressing the alignment edge of the matrix display panel against the display alignment device to align the imaging area with the display opening.

25. The display assembly of claim 24 wherein the lateral securing portion comprises a spring and ramp combination.

26. The display assembly of claim 15 further comprising a vertical securing portion, the vertical securing portion vertically compressing the matrix display panel within the housing.

27. The display assembly of claim 15 wherein the display alignment device comprises the registration edge within the housing of the assembly, the registration edge in communication with the alignment edge of the matrix display panel such that the interface between the alignment edge and the registration edge aligns the imaging area with the display opening.

28. The display assembly of claim 15 further comprising an optically transparent spacer coupled to the matrix display panel, the spacer providing alignment of the imaging area with respect to an optic element.

29. The display assembly of claim 28 wherein the optically transparent spacer is coupled to a viewer side surface of the display panel.

30. The display assembly of claim 28 wherein the optically transparent spacer is coupled to a backlight side surface of the matrix display panel.

31. The display assembly of claim 28 wherein the optically transparent spacer comprises a polarizer.

32. The display assembly of claim 15 wherein the display panel imaging area is optically aligned with a polarizer.

33. A method for mounting a matrix display panel, the display panel having a glass substrate with some nonuniform outer dimensions and an alignment edge, and an imaging area to a housing having a display opening, the alignment edge being aligned with the imaging area, the method comprising:
coupling a display alignment device to the housing; and
using the display alignment device which has a continuous linear registration edge, aligning the imaging area of the matrix display panel with the display opening of the housing based on direct continuous contact between the registration edge of the display alignment device and the alignment edge, the display alignment device and the housing compensating for said nonuniform outer dimensions.

34. The method of claim 33 wherein the display alignment device aligns the imaging area within a tolerance of 2° with respect to alignment with the display opening.

35. The method of claim 33 further comprising attaching a light source to the housing for illuminating the imaging area.

36. The method of claim 35 wherein the light source comprises a light emitting diode (LED).

37. The method of claim 36 wherein the LED emits a blue light, which is transmitted through a phosphor coating to generate a white light.

38. The method of claim 35 wherein the light source comprises a light pipe.

39. The method of claim 35 wherein the light source comprises a first diffuser and a second diffuser.

40. The method of claim 33 further comprising mounting a lens to the housing and adjacent to the display opening.

41. The method of claim 40 wherein the lens comprises a torro lens.

42. The method of claim 33 further comprising laterally compressing the alignment edge of the matrix display panel against the display alignment device to align the imaging area with the display opening.

43. The method of claim 33 further comprising vertically compressing the matrix display panel within the housing.

44. The method of claim 33 wherein the display alignment device comprises the registration edge within the housing of the assembly, the registration edge in communication with the alignment edge of the matrix display panel such that the interface between the alignment edge and the registration edge aligns the imaging area with the display opening.

45. The method of claim 33 wherein the matrix display panel is optically aligned with a polarizer.

46. A mounting apparatus for a matrix display panel, the display panel having a glass substrate with some nonuniform outer dimensions and an alignment edge, the display panel including an imaging area, the apparatus comprising:
a housing having a display opening;
a display alignment device coupled to the housing, the display alignment device aligning the imaging area of the matrix display panel with the display opening of the housing based on the alignment edge, the display alignment device and the housing compensating for said nonuniform outer dimensions; and
a lateral securing portion, the lateral securing portion laterally compressing the alignment edge of the matrix display panel against the display alignment device to align the imaging area with the display opening, the lateral securing portion comprising a spring and ramp combination.

47. A display assembly comprising:
a housing having a display opening;
a matrix display panel mounted within the housing, the display panel having an imaging area positioned in optical alignment with the display opening, and a glass substrate with some nonuniform outer dimensions and an alignment edge;
a display alignment device coupled to the housing, the display alignment device aligning the imaging area with the display opening based on the alignment edge, the display alignment device and the housing compensating for said nonuniform outer dimensions; and
a lateral securing portion, the lateral securing portion laterally compressing the alignment edge of the matrix display panel against the display alignment device to align the imaging area with the display opening, the lateral securing portion comprising a spring and ramp combination.

48. A method for mounting a matrix display panel, the display panel having a glass substrate with some nonuniform outer dimensions and an alignment edge, and an imaging area to a housing having a display opening, the method comprising:
coupling a display alignment device to the housing;
using the display alignment device to the align the imaging area of the matrix display panel with the display opening of the housing based on the alignment edge, the display alignment device and the housing compensating for said nonuniform outer dimensions; and
laterally compressing the alignment edge of the matrix display panel against the display alignment device with a spring and ramp combination to align the imaging area with the display opening.

* * * * *